(12) United States Patent
Hwang et al.

(10) Patent No.: US 12,282,986 B2
(45) Date of Patent: Apr. 22, 2025

(54) MOBILE TERMINAL AND COSMETICS AUTOMATIC RECOGNITION SYSTEM

(71) Applicant: LG HOUSEHOLD & HEALTH CARE LTD., Seoul (KR)

(72) Inventors: Hae Young Hwang, Seoul (KR); Bok Hyun Pack, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 72 days.

(21) Appl. No.: 16/982,956

(22) PCT Filed: Mar. 14, 2019

(86) PCT No.: PCT/KR2019/002990
§ 371 (c)(1),
(2) Date: Sep. 21, 2020

(87) PCT Pub. No.: WO2019/208927
PCT Pub. Date: Oct. 31, 2019

(65) Prior Publication Data
US 2021/0019926 A1 Jan. 21, 2021

(30) Foreign Application Priority Data
Apr. 24, 2018 (KR) .......................... 10-2018-0047286

(51) Int. Cl.
*G06T 11/60* (2006.01)
*G06F 3/0482* (2013.01)
(Continued)

(52) U.S. Cl.
CPC ................ *G06T 11/60* (2013.01); *G06F 3/14* (2013.01); *G06K 7/10366* (2013.01);
(Continued)

(58) Field of Classification Search
None
See application file for complete search history.

(56) References Cited

U.S. PATENT DOCUMENTS 9,603,437 B2  3/2017  Nguyen et al.
9,984,281 B2  5/2018  Tomita et al.
(Continued)

FOREIGN PATENT DOCUMENTS

CN    101779218 A    7/2010
CN    202028378 U   11/2011
(Continued)

OTHER PUBLICATIONS

International Search Report (PCT/ISA/210) issued in PCT/KR2019/002990, dated Jun. 25, 2019.
(Continued)

*Primary Examiner* — Kyle Zhai
(74) *Attorney, Agent, or Firm* — Birch, Stewart, Kolasch & Birch, LLP

(57) ABSTRACT

The present invention relates to a mobile terminal and a cosmetics automatic recognition system capable of recognizing cosmetics located nearby and recommending a makeup method using the recognized cosmetics. The present invention may comprise a mobile terminal including: an RFID reader unit configured to recognize cosmetics through an RFID tag attached to a cosmetic and receive cosmetic information from the recognized RFID tag and from cosmetics having an RFID tag which stores cosmetic information attached thereto; a control unit configured to generate a cosmetics list consisting of at least one cosmetic recognized by the RFID reader unit; and a display unit configured to display the cosmetics list.

22 Claims, 24 Drawing Sheets

(51) Int. Cl.
  *G06F 3/14* (2006.01)
  *G06K 7/10* (2006.01)
  *G06K 19/07* (2006.01)
  *G06Q 30/0601* (2023.01)
  *H04M 1/72403* (2021.01)

(52) U.S. Cl.
  CPC ..... *G06K 19/0723* (2013.01); *G06Q 30/0631* (2013.01); *H04M 1/72403* (2021.01); *G06F 3/0482* (2013.01); *G06T 2200/24* (2013.01); *H04M 2242/28* (2013.01); *H04M 2242/30* (2013.01); *H04M 2250/04* (2013.01); *H04M 2250/10* (2013.01); *H04M 2250/52* (2013.01)

(56) References Cited

U.S. PATENT DOCUMENTS

| | | | |
|---|---|---|---|
| 10,373,348 | B2 | 8/2019 | Sugaya |
| 10,623,633 | B2 | 4/2020 | Tanaka |
| 2008/0215625 | A1* | 9/2008 | Veitch ................ G06Q 10/08 |
| 2012/0217254 | A1* | 8/2012 | Cho ..................... F25D 29/00 |
| | | | 220/592.02 |
| 2012/0223956 | A1 | 9/2012 | Saito et al. |
| 2016/0000209 | A1 | 1/2016 | Yamanashi et al. |
| 2016/0055566 | A1* | 2/2016 | Otani ................ G06Q 30/0201 |
| | | | 705/7.29 |
| 2016/0128450 | A1 | 5/2016 | Saito et al. |
| 2016/0292901 | A1* | 10/2016 | Li ........................... G06T 13/80 |
| 2016/0357578 | A1* | 12/2016 | Kim ..................... A45D 44/005 |
| 2017/0178220 | A1 | 6/2017 | Chong et al. |
| 2017/0219279 | A1* | 8/2017 | Chae ...................... G01K 1/024 |
| 2017/0256040 | A1* | 9/2017 | Grauer ..................... G06T 3/40 |
| 2019/0122015 | A1* | 4/2019 | Huang ............... G06K 7/10356 |
| 2019/0197736 | A1* | 6/2019 | Sugaya ............. G06Q 30/0623 |
| 2019/0295151 | A1* | 9/2019 | Ghadar ............... G06F 16/9038 |

FOREIGN PATENT DOCUMENTS

| | | |
|---|---|---|
| CN | 104380339 A | 2/2015 |
| CN | 105138648 A | 12/2015 |
| CN | 105210110 A | 12/2015 |
| CN | 106108523 A | 11/2016 |
| CN | 106575446 A | 4/2017 |
| CN | 107111861 A | 8/2017 |
| CN | 107273837 A | 10/2017 |
| CN | 107431757 A | 12/2017 |
| JP | 2002-92132 A | 3/2002 |
| JP | 2004-326532 A | 11/2004 |
| JP | 2006-48393 A | 2/2006 |
| JP | 2006-244118 A | 9/2006 |
| JP | 2007-213623 A | 8/2007 |
| JP | 2010-199756 A | 9/2010 |
| JP | 2012-181688 A | 9/2012 |
| JP | 2014-166218 A | 9/2014 |
| JP | 2014-191813 A | 10/2014 |
| JP | 2017-211998 A | 11/2017 |
| KR | 10-2007-0076164 A | 7/2007 |
| KR | 10-2007-0092650 A | 9/2007 |
| KR | 10-2009-0005641 A | 1/2009 |
| KR | 10-2011-0127396 A | 11/2011 |
| KR | 20-2012-0005631 U | 8/2012 |
| KR | 10-2014-0061604 A | 5/2014 |
| KR | 10-2015-0093930 A | 8/2015 |
| KR | 10-1632542 B1 | 6/2016 |
| KR | 10-2016-0142742 A | 12/2016 |
| KR | 10-2017-0030446 A | 3/2017 |
| KR | 10-1741409 B1 | 5/2017 |
| WO | WO 2018/008138 A1 | 1/2018 |
| WO | WO 2018/012136 A1 | 1/2018 |
| WO | WO 2018/012222 A1 | 1/2018 |
| WO | WO 2018/025402 A1 | 2/2018 |

OTHER PUBLICATIONS

Hideki Konta et al., "A study of RFID field testing Intended for cosmetic," 2006 IEICE Communications Society Conference, Kanazawa University, Kanazawa, Sep. 19-22, 2006, pp. 2-5 (4 pages), with English translation.

"Realistic makeup system based on 3D facial avatar," ETRI, [online], 2014, URL: <https://itec.etri.re.kr/itec/sub02/sub02_01.do>, 24 pages total, with an English translation.

* cited by examiner

| C1 COSMETIC | |
|---|---|
| NAME | C1 |
| IMAGE |  |
| CATEGORY | BASE > SKIN |
| MANUFACTURE DATE | 2017-11-01 |
| RECOGNITION DATE | 2018-01-01 |
| PROPERTY | SUITABLE FOR DRY SKIN |

MOBILE TERMINAL AND COSMETICS AUTOMATIC RECOGNITION SYSTEM

CROSS REFERENCE TO RELATED APPLICATIONS

This application is the National Phase of PCT International Application No. PCT/KR2019/002990, filed on Mar. 14, 2019, which claims priority under 35 U.S.C. 119(a) to Patent Application No. 10-2018-0047286, filed in the Republic of Korea on Apr. 24, 2018, all of these applications are hereby expressly incorporated by reference into the present application.

TECHNICAL FIELD

The present invention relates to a mobile terminal and a cosmetics automatic recognition system, and more particularly, to a mobile terminal for recognizing cosmetics through an RFID tag attached to cosmetics and an cosmetics automatic recognition system including the mobile terminal that recognizes the cosmetics through the cosmetics to which the RFID tag is attached and the RFID tag.

BACKGROUND ART

Users tend to be more interested in beauty products such as cosmetics and makeups, beauty services, and the like according to the development of beauty industry. In addition, the types of cosmetics have increased, and the utilization of cosmetics has been diversified according to the development of the beauty industry.

According to this tendency, users have purchased and used various types of cosmetics. However, as the type of cosmetics increases, the users may have difficulties in managing and utilizing the purchased cosmetics. For example, the users may face problems such as having difficulty in finding an optimal makeup method using their possessed cosmetics, or continuing to use old cosmetics because a usable period of each of their possessed cosmetics is different from each other.

Therefore, the users may need services such as checking their possessed cosmetics to inform a remaining usage period, and recommending the optimal makeup method using their possessed cosmetics.

DISCLOSURE

Technical Problem

The present invention is directed to providing a mobile terminal and a cosmetics automatic recognition system for automatically recognizing cosmetics located nearby.

The present invention is directed to providing a mobile terminal and a cosmetics automatic recognition system for recognizing cosmetics possessed by a user.

The present invention is directed to providing a mobile terminal and a cosmetics automatic recognition system for guiding cosmetics possessed by a user.

The present invention is directed to providing a mobile terminal and a cosmetics automatic recognition system for recommending a makeup method using cosmetics possessed by a user.

Technical Solution

According to an embodiment of the present invention, a mobile terminal may include an input unit for receiving a user input, an RFID reader unit for recognizing cosmetics through an RFID tag attached to the cosmetics and receiving cosmetic information from the recognized RFID tag, a control unit for generating a cosmetics list consisting of at least one cosmetic recognized through the RFID reader unit, and a display unit for displaying the cosmetics list.

The cosmetics list may be a list in which at least one cosmetic recognized by the RFID reader unit is classified according to cosmetic categories to display it.

The control unit may receive a selection command for selecting at least one of cosmetics displayed in the cosmetics list as possessed cosmetics, and may classify and display cosmetics selected according to the selection command and cosmetics not selected.

The control unit may further display sales information related to the cosmetics not selected.

When the cosmetics list is displayed, the control unit may display cosmetics in ascending order of remaining usage periods of the cosmetics.

The control unit may calculate the remaining usage periods of the cosmetics based on at least one of manufacture date information of the cosmetics included in the cosmetic information received from the RFID tag or recognition date information of the cosmetics recognized through the RFID tag.

The control unit may recommend a makeup method using cosmetics included in the cosmetics list, and may display the recommended makeup method.

The control unit may further include a makeup result simulation according to the recommended makeup method.

The control unit may recognize the cosmetics when receiving a cosmetics recognition command through the input unit.

The mobile terminal may further include a location detection unit for detecting a current location, and the control unit may recognize the cosmetics when the current location detected by the location detection unit is a preset location.

The control unit may set a recognition range of the cosmetics as a first range when the current location is a first location, and may set the recognition range of the cosmetics as a second range when the current location is a second location.

The control unit may generate a first cosmetics list by recognizing the cosmetics at the first location, and may generate a second cosmetics list by recognizing the cosmetics at the second location.

When re-recognizing the cosmetics at the first location, the control unit may display a notification when a part of the cosmetics included in the first cosmetics list is not recognized or the cosmetics not included in the first cosmetics list are recognized, and when re-recognizing the cosmetics at the second location, the control unit may display the notification when a part of the cosmetics included in the second cosmetics list is not recognized or the cosmetics not included in the second cosmetics list are recognized.

The control unit may set the recognition range of the cosmetics, and may recognize cosmetics existing within the recognition range.

The control unit may adjust a frequency of an RF signal transmitted to recognize the cosmetics according to the recognition range of the cosmetics.

The control unit may recognize the cosmetics by transmitting an RF signal having a first frequency when the recognition range of the cosmetics is set to the first range, and may recognize the cosmetics by transmitting an RF signal having a second frequency when the recognition range of the cosmetics is set to the second range.

According to an embodiment of the present invention, a cosmetics automatic recognition system may include a mobile terminal including an RFID reader unit for recognizing cosmetics through cosmetics to which an RFID tag storing cosmetic information is attached and the RFID tag attached to the cosmetics and receiving the cosmetic information from the recognized RFID tag, a control unit for generating a cosmetics list consisting of at least one cosmetic recognized through the RFID reader unit, and a display unit for displaying the cosmetics list.

The cosmetics list may be a list in which at least one cosmetic recognized through the RFID reader unit is classified according to cosmetic categories to display it.

The mobile terminal may recommend a makeup method using cosmetics included in the cosmetics list, and may display the recommended makeup method.

According to an embodiment of the present invention, a cosmetics automatic recognition system may further include a server for updating and storing cosmetic information, and a mobile terminal may receive information related to generation of a cosmetics list from the server.

Advantageous Effects

According to an embodiment of the present invention, the mobile terminal easily recognizes cosmetics located nearby to guide to a user, and thus there is an advantage that the user may check existence of lost or forgotten cosmetics.

According to the embodiment of the present invention, the mobile terminal recognizes the cosmetics located nearby and organizes them by category to guide to the user, and thus there is an advantage that the user may easily check what type of cosmetics are a lot and what type of cosmetics are insufficient.

According to the embodiment of the present invention, the mobile terminal not only recognizes cosmetics existing nearby, but also receives selection on cosmetics actually possessed by the user, and thus there is an advantage that it may manage only the cosmetics that the user actually possesses and provide relevant information about cosmetics not possessed by the user.

According to the embodiment of the present invention, the mobile terminal displays a cosmetics list based on a remaining usage period of the cosmetics existing nearby, and thus there is an advantage that it is possible to restrict usage of old cosmetics or to inform the user to promptly use the cosmetics because a usable period is imminent.

According to the embodiment of the present invention, the mobile terminal displays a makeup result simulation, and thus there is an advantage that it is possible to guide to the user a makeup result that may be derived by using the cosmetics possessed by the user. In particular, the mobile terminal may display the makeup result simulation in consideration of user information or environment information, and thus there is an advantage that it is possible to recommend an optimal makeup method according to a condition and a situation of a makeup day.

According to the embodiment of the present invention, the mobile terminal adjusts a recognition range of the cosmetics based on a current location, and thus there is an advantage that it is possible to improve the probability of recognizing only the cosmetics possessed by the user.

According to the embodiment of the present invention, there is an advantage that it is possible to adjust the recognition range of the cosmetics according to the user's preference.

According to the embodiment of the present invention, there is an advantage that it is possible to quickly notify a change item of the cosmetics to the user by re-recognizing the cosmetics at the same location and updating the cosmetics list every predetermined period.

MODES OF THE PRESENT INVENTION

Figure 1:
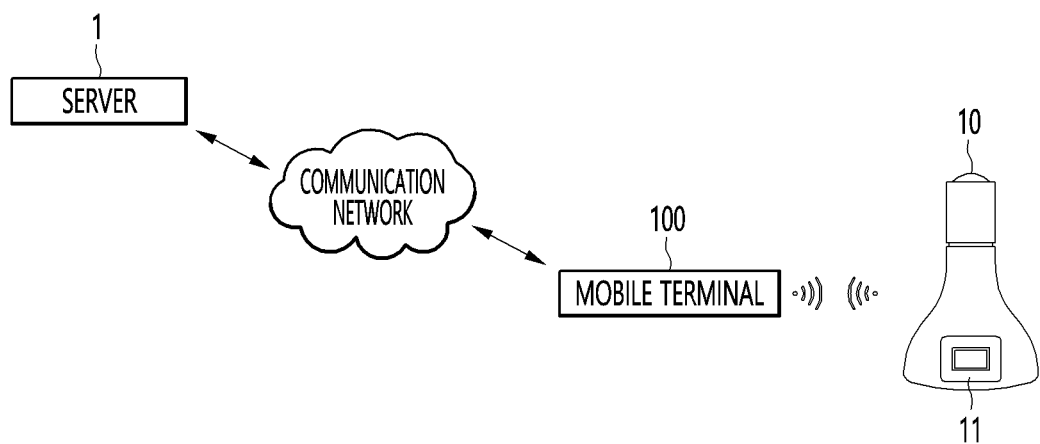
FIG. 1 is a schematic diagram showing a cosmetics automatic recognition system according to an embodiment of the present invention.

Hereinafter, embodiments will be described in detail with reference to the accompanying drawings, however, the same ingredients are designated by the same reference numerals, and repeated description thereof will be omitted. Suffixes "module" and "part" for elements used in the following descriptions are given or used just for convenience in writing the specification, and do not have meanings or roles distinguishable between them. In addition, in describing embodiments of the present disclosure, when detailed description of a known function is deemed to unnecessarily blur the gist of the present disclosure, the detailed description will be omitted. Further, accompanying drawings are only for easily understanding embodiments disclosed in the present disclosure, and the technical spirit disclosed in the present disclosure are not limited by the accompanying drawings, and it should be understood that the present invention includes all modifications, equivalents, and alternatives falling within the spirit and scope of the claims.

It should be understood that, although the terms first, second, and the like may be used herein to describe various elements, these elements are not limited by these terms. The terms are only used to distinguish one element from another.

Elements referred to in singular may be number one or more, unless the context clearly indicates otherwise.

It should be further understood that the terms "comprises," "comprising," "includes," and/or "including," when used herein, specify the presence of stated features, integers, steps, operations, elements, and/or ingredients, but do not preclude the presence or addition of one or more other features, integers, steps, operations, elements, ingredients, and/or groups thereof.

Hereinafter, a mobile terminal and a cosmetics automatic recognition system according to an embodiment of the present invention will be described.

FIG. 1 is a schematic diagram showing a cosmetics automatic recognition system according to an embodiment of the present invention.

As shown in FIG. 1, the cosmetics automatic recognition system according to an embodiment of the present invention may include a cosmetic 10 having an RFID tag 11 and a mobile terminal 100 recognizing the RFID tag 11. According to the embodiment, the cosmetics automatic recognition system may further include a server 1 for transmitting/receiving a signal to/from the mobile terminal 100.

Each cosmetic 10 may include the RFID tag 11. That is, the RFID tag 11 may be included for each one cosmetic 10.

The cosmetic 10 may include the RFID tag 11, and the RFID tag 11 may be attached to the cosmetic 10.

The RFID tag 11 may store cosmetic information. The cosmetic information may indicate information related to the cosmetic 10 to which the RFID tag 11 is attached. For example, the cosmetic information may include at least a part or all of a name, an image, a category, a manufacture date, properties (ingredient, color, effect, etc.) or a manufacturer. However, it is merely exemplary, and the cosmetic information may further include other information in addition to the information listed above.

The RFID tag 11 may store different information for each cosmetic 10. Specifically, the RFID tag 11 may not only store different information according to a type of cosmetics attached thereto, but also the RFID tag 11 may store different information according to the cosmetic 10 to be attached thereto even for the same type of cosmetics. For example, in case of the RFID tags 11 attached to the same type of cosmetics, cosmetic information having different manufacture dates may be stored.

Meanwhile, in some cases, each of a plurality of RFID tags 11 may store the same cosmetic information.

The RFID tag 11 may embed a small IC chip, an antenna, a memory for storing cosmetic information, a battery, and the like, and may transmit the stored cosmetic information to an RFID reader unit to be described later through a protocol. The IC Chip may store an identification code.

Meanwhile, according to an embodiment, the cosmetic 10 may include a plurality of RFID tags 11 having an antenna which has a different frequency band respectively, or the cosmetics 10 may include one RFID tag 11, and the one RFID tag 11 may include an antenna which has a different frequency band respectively. Accordingly, as will be described later, the RFID reader unit may adjust a cosmetics recognition range.

The server 1 may transmit information related to generation of a cosmetics list to the mobile terminal 100. The information related to the generation of the cosmetics list may include cosmetic information for each cosmetic constituting the cosmetics list, and at least one or more of a function used for generating the cosmetics list or application data.

The server 1 may update cosmetic information every predetermined period, and may store the updated cosmetic information. Accordingly, the server 1 may store the latest information of each cosmetic.

The server 1 may store the function data used to generate the cosmetics list or the application data.

The server 1 may be a host that receives and processes data from the RFID reader unit.

The server 1 may perform wireless communication with the mobile terminal 100.

Figure 2:
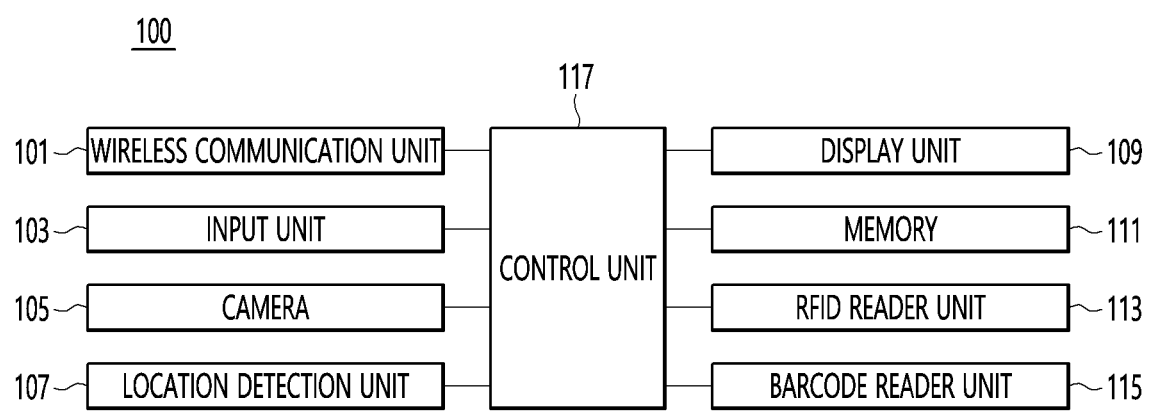
FIG. 2 is a control block diagram of a mobile terminal according to an embodiment of the present invention.

FIG. 2 is a control block diagram of a mobile terminal according to an embodiment of the present invention.

The mobile terminal 100 may include at least a part or all of a wireless communication unit 101, an input unit 103, a camera 105, a location detection unit 107, a display unit 109, a memory 111, an RFID reader unit 113, a barcode reader unit 115, or a control unit 117. Meanwhile, the components shown in FIG. 2 are merely exemplary, and the mobile terminal 100 may further include other components in addition to the components shown in FIG. 2.

The wireless communication unit 101 may transmit/receive a wireless signal to/from another mobile terminal or transmit/receive a wireless signal to/from the server 1.

The wireless communication unit 101 may receive an application for generating a cosmetics list from the server 1.

The wireless communication unit 101 may be formed of one module including each of the RFID reader unit 113 and the barcode reader unit 115 to be described later, or may be formed of a separate module.

The input unit 103 may receive a command from a user. The input unit 103 may include a key button, or may be formed with a touch screen.

The input unit 103 may receive a cosmetics recognition command. In addition, the input unit 103 may receive a command for specifying only possessed cosmetics, a command for recommending makeup, a command for changing a viewing method of the cosmetics list, and the like.

The camera 105 may photograph a facial image of the user. The control unit 117 may apply a recommended makeup to the facial image photographed by the camera 105 to execute a makeup result simulation.

The location detection unit 107 may detect a current location of the mobile terminal 100. The location detection unit 107 may include a global positioning system (GPS).

The control unit 117 may preset a home location, an office location, and the like, and may detect whether the current location is a home or an office via the location detection unit 107.

The display unit 109 may recognize cosmetics located nearby and display a cosmetics list indicating the recognized cosmetics. In addition, the display unit 109 may display various information related to the cosmetics list.

The memory 111 may store information related to generation of the cosmetics list, a pre-generated cosmetics list, cosmetic information of the recognized cosmetics, and the like.

The RFID reader unit 113 may recognize cosmetics by recognizing at least one RFID tag 11. In detail, the RFID reader unit 113 may transmit an RF signal, and may recognize the cosmetics by receiving cosmetic information from the RFID tag 11 as the RF signal reaches the RFID tag 11.

In detail, the RFID reader unit 113 may include an antenna, and may receive the cosmetic information from the RFID tag 11 through a frequency and protocol set using the antenna.

According to one embodiment, the RFID reader unit 113 may be a multiband/multiprotocol terminal supporting various frequency bands and heterogeneous protocols.

According to another embodiment, the RFID reader unit 113 may include a plurality of RFID readers, and each of the plurality of RFID readers may have an antenna having a different frequency band.

According to still another embodiment, the RFID reader unit 113 may include one RFID reader, and the one RFID reader may include a plurality of antennas having different frequency bands.

Meanwhile, the mobile terminal 100 according to the embodiment of the present invention preferably includes the RFID reader unit 113 using RFID, but according to an embodiment, it may also include a short-distance communication module using a short-distance communication technology other than the RFID reader unit 113.

The mobile terminal 100 may further include a barcode reader unit 115. The bar code reader unit 115 may read a barcode. In particular, in the present invention, the bar code reader unit 115 may recognize a barcode attached to the cosmetic 10.

In some cases, the user has controlled to recognize the cosmetics located around by an RFID method, there may be a cosmetic that is not recognized. In this case, the user may manually recognize the cosmetics not recognized using the barcode reader unit 115. As described above, the mobile terminal 100 according to the embodiment of the present invention may include both the RFID reader unit 113 and the barcode reader unit 115 to automatically and manually recognize the cosmetics, and there is an advantage that may recognize all without missing any cosmetics located nearby.

The control unit 117 may control the overall operation of the mobile terminal 100. The control unit 117 may control so as to recognize the cosmetics located nearby by the RFID reader unit 113, may generate the cosmetics list using the cosmetics recognized by the RFID reader unit 113 and/or the barcode reader unit 115, or may control an operation of recommending makeup using cosmetics included in the cosmetics list.

Figure 3:
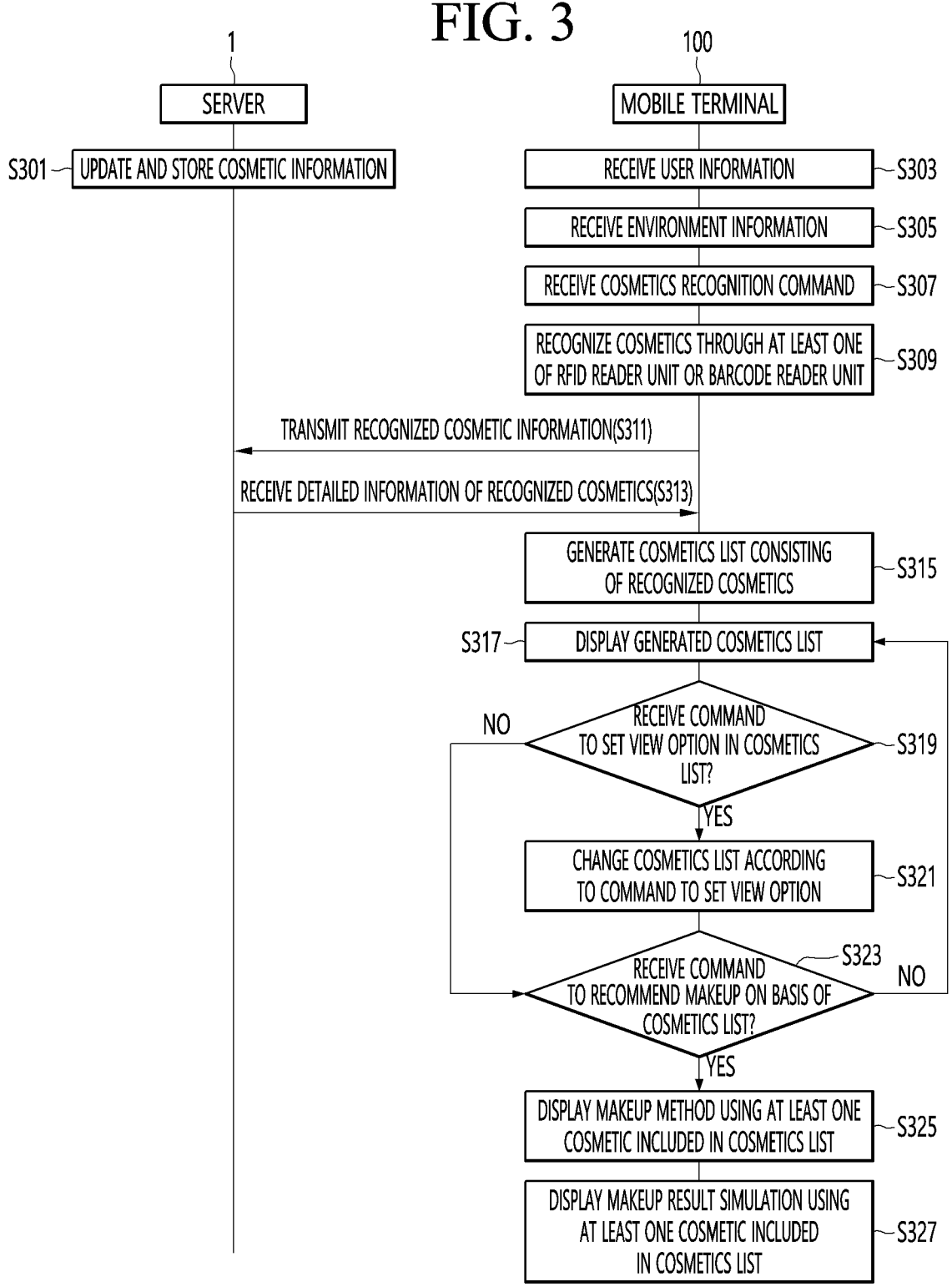
FIG. 3 is a ladder diagram showing a method of operating a mobile terminal according to an embodiment of the present invention.

FIG. 3 is a ladder diagram showing a method of operating a mobile terminal according to an embodiment of the present invention.

The server 1 may update and store cosmetic information (S301).

The server 1 may store information on cosmetics released already, and when there is a change in the information on the cosmetics released already, the server 1 may update and store the cosmetic information by reflecting the change.

In addition, when new cosmetics are released, the server 1 may receive and store information of the new cosmetics.

In addition, the server 1 may store various information related to generation of a cosmetics list.

Meanwhile, the control unit 117 of the mobile terminal 100 may receive user information (S303).

Here, the user information may include current location information of the mobile terminal 100, schedule information registered in the mobile terminal 100, and the like as information related to a user who wants to generate the cosmetics list.

The control unit 117 may receive the current location information by detecting the current location by the location detection unit 107 in real time, or may receive the schedule information by reading out the schedule information stored in the memory 111.

The control unit 117 may use the current location information when setting a recognition range of the cosmetics. The control unit 117 may use the schedule information when recommending makeup.

According to an embodiment, when the current location is a preset location, the control unit 117 may recognize that a cosmetics recognition command of step S307 is received. Alternatively, when a date and time according to the schedule information stored in the memory 111 is reached, the control unit 117 may recognize that the cosmetics recognition command of the step S307 is received.

Alternatively, an order of steps S303 and S307 may be changed.

The control unit 117 may receive environment information (S305).

Here, the environment information may include weather information, fine dust concentration information, and the like.

The control unit 117 may receive the environment information by the wireless communication unit 101 for each of predetermined periods.

Alternatively, the order of steps S305 and S307 may be changed, and when the order is changed, the control unit 117 may receive the environment information in response to receiving a cosmetics recognition command.

The control unit 117 may use the environment information when recommending makeup.

The control unit 117 may receive the cosmetics recognition command (S307). When the control unit 117 receives the cosmetics recognition command, the control unit 117 may recognize the cosmetics by at least one of the RFID reader unit 113 or the barcode reader unit 115 (S309).

According to one embodiment of the present disclosure, the control unit 117 may receive the cosmetics recognition command by the input unit 103. The user may input the cosmetics recognition command via the input unit 103.

According to another embodiment, the control unit 117 may receive a cosmetics recognition command as the current location is recognized as a preset location. The preset location may be at least one, for example, home, office, or the like. When the current location is set to home so as to recognize the cosmetics, the control unit 117 may recognize the cosmetics by assuming that the cosmetics recognition command is received whenever the current location is detected as home. Locations of homes, companies, etc. are merely exemplary, and thus the embodiment is not limited thereto.

According to another embodiment, the control unit 117 may receive a cosmetics recognition command based on the date and time according to the schedule information. For example, when a schedule of a meeting at 7 pm on Apr. 18, 2018 is registered, the control unit 117 may assume that the cosmetics recognition command has been received at 6 am on Apr. 18, 2018 to recognize cosmetics.

Figure 4:
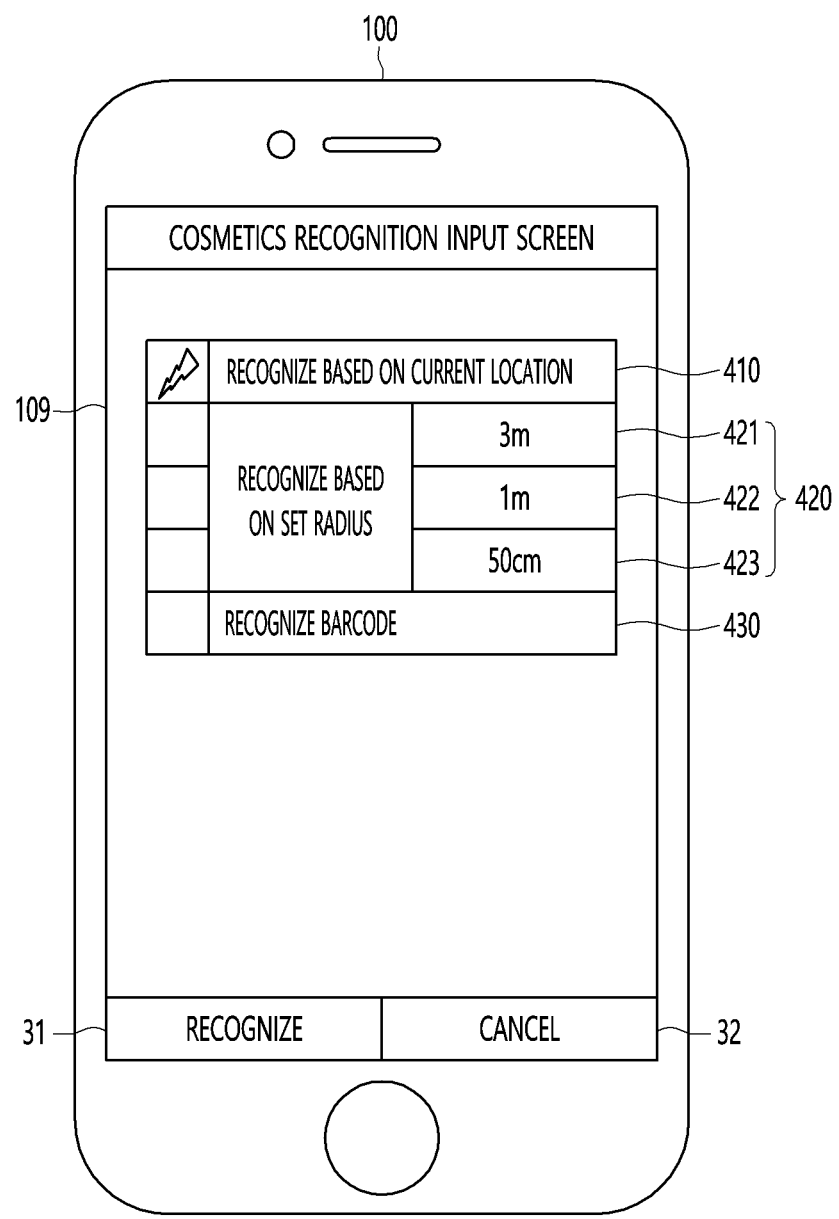
FIG. 4 is an exemplary view showing a method of receiving a cosmetics recognition command through an input unit according to an embodiment of the present invention.
Figure 5:
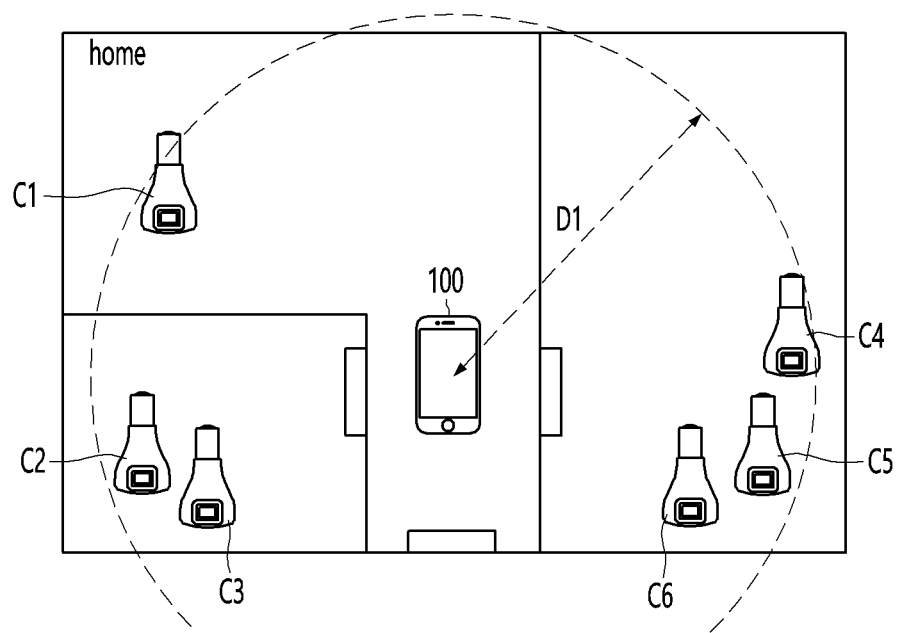
FIGS. 5 and 6 are exemplary views showing a method of recognizing cosmetics based on a current location according to an embodiment of the present invention.
Figure 6:
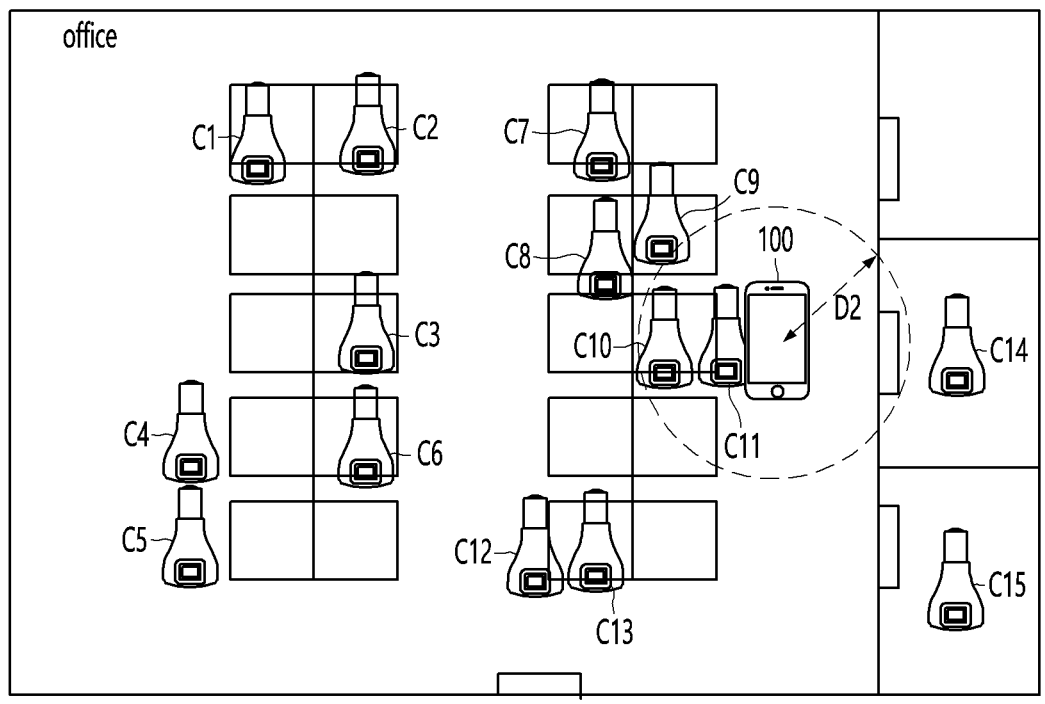
Figure 7:
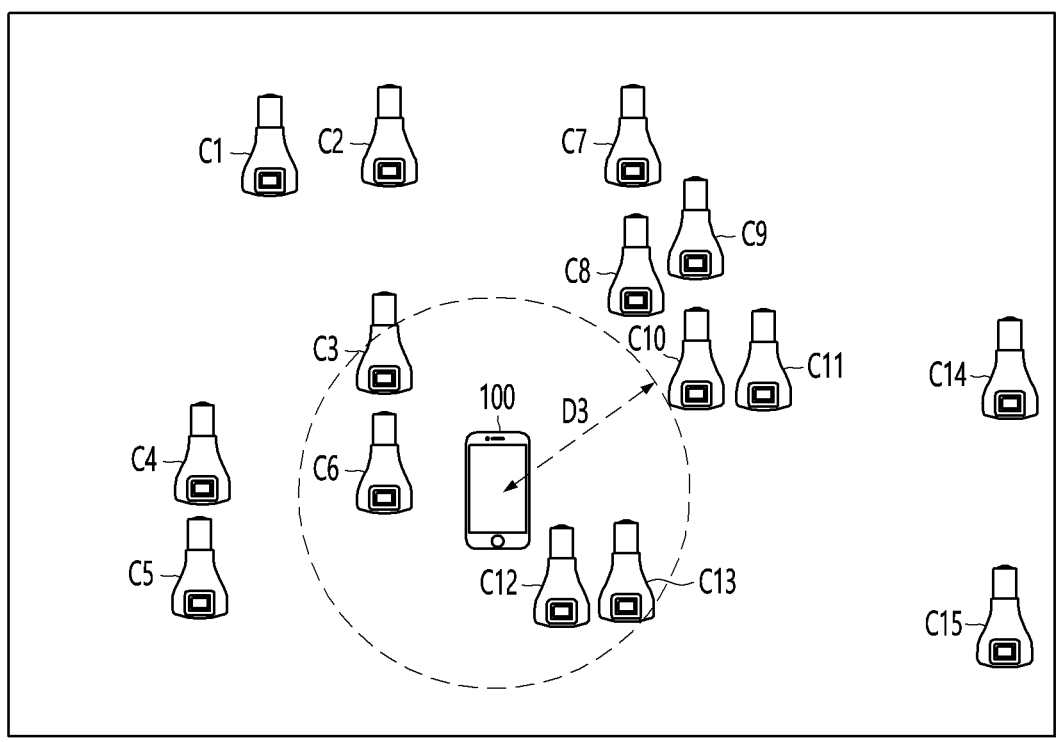
FIG. 7 is an exemplary view showing a method of recognizing cosmetics based on a set recognition range according to an embodiment of the present invention.

Next, FIG. 4 is an exemplary view showing a method of receiving a cosmetics recognition command through an input unit according to an embodiment of the present invention, FIGS. 5 and 6 are exemplary views showing a method of recognizing cosmetics based on a current location according to an embodiment of the present invention, and FIG. 7 is an exemplary view showing a method of recognizing cosmetics based on a set recognition range according to an embodiment of the present invention.

Referring to FIG. 4, the display unit 109 may display a cosmetics recognition input screen. The cosmetics recognition input screen may include at least one of cosmetics recognition setting items 410, 420, and 430, a recognition icon 31, or a cancel icon 32.

The cosmetics recognition setting items 410, 420, and 430 may include a location-based cosmetics recognition item 410, a set distance-based cosmetics recognition item 420, and a barcode-based cosmetics recognition item 430.

The control unit 117 may select any one of the cosmetics recognition setting items 410, 420, and 430, and then may receive a selection command of the recognition icon 31. The control unit 117 may receive a cosmetics recognition command as the recognition icon 31 is selected. When the control unit 117 receives the cosmetics recognition command, the control unit 117 may recognize cosmetics based on the selected cosmetics recognition setting item.

When the location-based cosmetics recognition item 410 is selected, the control unit 117 may recognize the cosmetics based on the current location.

In detail, the control unit 117 may detect the current location, may recognize the cosmetics by setting a recognition range of the cosmetics as a first range when the current location is a first location, and may recognize the cosmetics by setting the recognition range of the cosmetics as a second range when the current location is a second location.

The first location and the second location may be set already. For example, the first location may be a location set to home, and the second location may be a location set to an office.

The first range and the second range may be set already. For example, the first range may be a range within a radius D1, and the second range may be a range within a radius D2.

As shown in FIG. 5, when the current location is home, the control unit 117 may recognize cosmetics within the radius D1 to recognize first to sixth cosmetics C1 to C6.

Meanwhile, as shown in FIG. 6, when the current location is an office, the control unit 117 may recognize cosmetics within the radius D2 to recognize tenth and eleventh cosmetics C10 and C11, and may not recognize first to ninth cosmetics C1 to C9 and twelfth to fifteenth cosmetics C12 to C15.

In this case, the control unit 117 may set the recognition range according to characteristics of the current location, and thus there is an advantage of being able to recognize the cosmetics according to characteristics of the current location. That is, when the current location is the home, most of the cosmetics located at home are likely to be a user's cosmetics, and thus the control unit 117 sets the recognition range to be wide, and when the current location is the office, a lot of cosmetics located in the office are cosmetics of other users, and thus the control unit 117 sets the recognition range to be narrow, and accordingly, it is possible to increase possibility of recognizing only the cosmetics possessed by the user.

Meanwhile, although a case in which the location-based cosmetics recognition item 410 is selected has been taken as an example, FIGS. 5 and 6 may also be applied to a case in which the cosmetics recognition command is received when the current location is a preset location.

Referring again to FIG. 4, when the set distance-based cosmetics recognition item 420 is selected, the control unit 117 may recognize the cosmetics based on the set distance. The set distance-based cosmetics recognition item 420 may include an item 421 for recognizing cosmetics within a first radius (e.g., 3 m), an item 422 for recognizing cosmetics within a second radius (e.g., 1 m), and an item 423 for recognizing cosmetics within a third radius (e.g., 50 cm). However, the set radius and the number of items is merely exemplary, and thus the embodiment is not limited thereto.

When the set distance-based cosmetics recognition item 420 is selected, the control unit 117 may recognize cosmetics existing within the set recognition range. For example, as shown in FIG. 7, when the set recognition range is within a radius D3, the control unit 117 may recognize the cosmetics within the radius D3 to recognize the third cosmetic C3, the sixth cosmetic C6, and the twelfth and thirteenth cosmetics C12 and C13, and may not recognize the first and second cosmetics C1 and C2, the fourth and fifth cosmetics C4 and C5, the seventh to eleventh cosmetics C7 to C11, and the fourteenth and fifteenth cosmetics C14 and C15.

In this case, there is an advantage that the recognition range may be set according to the user's preference, and the cosmetics may be recognized only within the set recognition range.

As described above, according to the embodiment of the present invention, the control unit 117 may set a recognition range of cosmetics, and may recognize only cosmetics existing within the recognition range.

The control unit 117 may adjust a frequency of an RF signal transmitted by the RFID reader unit 113 to recognize the cosmetics according to the recognition range of the cosmetics.

In detail, the control unit 117 may recognize the cosmetics by transmitting an RF signal having a first frequency when the recognition range of the cosmetic is set to a first range, and may recognize the cosmetics by transmitting an RF signal having a second frequency when the recognition range of the cosmetics is set to a second range, and may recognize the cosmetics by transmitting an RF signal having a third frequency when the recognition range of the cosmetics is set to a third range. At this time, the first range may be within 500 cm radius and the first frequency may be 125 kHz, the second range may be within 1 m radius and the second frequency may be 2.45 GHz, and the third range may be within 50 cm radius and the third frequency may be 433 MHz, but it is merely exemplary for convenience of description and need not be limited thereto.

According to one embodiment of the present invention, the RFID reader unit 113 may be provided with a plurality of antennas having different frequencies to adjust the frequency of the RF signal. Alternatively, the RFID reader unit 113 may include a plurality of RFID readers having different frequencies, so that the frequency of the RF signal may be adjusted by driving any one of the RFID readers.

Likewise, the RFID tag 11 may include a plurality of antennas having different frequencies or may include a plurality of RFID tags.

The control unit 117 may change the recognition range by adjusting the frequency of the RF signal in this manner. However, it is also merely exemplary, and the recognition range may be changed in other manners.

Referring again to FIG. 4, when the barcode-based cosmetics recognition item 430 is selected, the control unit 117 may drive the barcode reader unit 115 to recognize the cosmetics. The barcode reader unit 115 may recognize the cosmetics by reading a barcode attached to the cosmetics.

In this case, there is an advantage that the user may manually recognize the cosmetics by positioning the barcode of the cosmetics close to the barcode reader unit 115.

The control unit 117 may receive cosmetic information as the cosmetics is recognized in step S309. That is, the control unit 117 may control so that the RFID reader unit 113 transmits the RF signal to the RFID tag 11, and may receive the cosmetic information from the RFID tag 11 to recognize the cosmetics.

Figure 8:
FIG. 8 is an exemplary view showing cosmetic information received from an RFID tag according to an embodiment of the present invention.

FIG. 8 is an exemplary view showing cosmetic information received from an RFID tag according to an embodiment of the present invention.

The RFID reader unit 113 may receive the cosmetic information from the RFID tag 11, and the cosmetic information may be information related to the cosmetic 10 to which the RFID tag 11 is attached. The cosmetic information may include at least a part or all of a name, an image, a category, a manufacture date, a recognition date at which the RFID tag is recognized, and properties.

FIG. 3 will be described again.

The control unit 117 may transmit recognized cosmetic information to the server 1 (S311), and may receive detailed information of the recognized cosmetics from the server 1 (S313).

The control unit 117 may receive the detailed information and the latest information related to the cosmetics recognized in step S311 and step S313.

According to the embodiment, the step S311 and the step S313 may be omitted.

The control unit 117 may generate a cosmetics list consisting of the recognized cosmetics (S315).

The control unit 117 may generate the cosmetics list based on the cosmetic information.

The cosmetics list may be a list indicating the recognized cosmetics, and may be a list in which at least one cosmetic recognized by the RFID reader unit 113 is classified according to cosmetic categories. The cosmetics list may further include cosmetics recognized by the barcode reader unit 115. In addition, the cosmetics list may further include cosmetics manually input by the user through the input unit 103.

For example, the cosmetic categories may include a major category that classifies into basic cosmetics and color cosmetics, a sub-category that classifies into skin, essence, eye cream, lotion, day cream, and sunscreen cream among the basic cosmetics, and a sub-category that classifies into base, foundation, eyebrows, eyelines, lip, and blusher among the color cosmetics. That is, the cosmetics list may be a list displayed for each category by determining whether each of the recognized cosmetics belongs to any one of skin, essence, eye cream, lotion, day cream, and sunscreen cream among the basic cosmetics, or any one of base, foundation, eyebrow, eye line, lip, and blusher among the color cosmetics.

The display unit 109 may display the generated cosmetics list (S317).

The control unit 117 may determine whether a view option setting command of the cosmetics list is received (S319), and when the view option setting command is received, the control unit 117 may change the cosmetics list according to the view option setting command (S321).

A method of displaying a cosmetics list according to an embodiment of the present invention will be described with reference to FIGS. 9 to 15.

Figure 9:
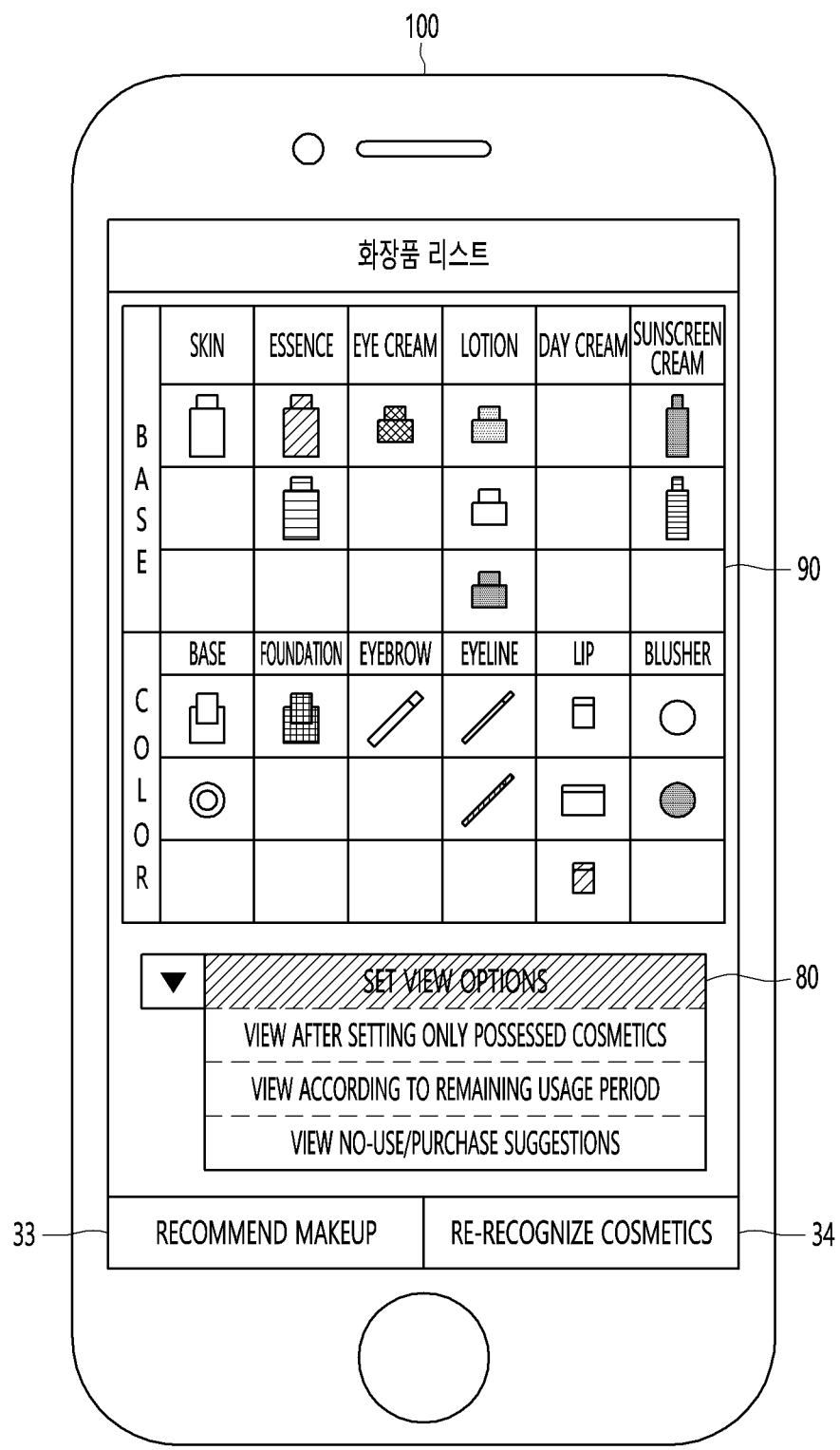
FIG. 9 is an exemplary view showing a method of displaying a cosmetics list according to an embodiment of the present invention.

FIG. 9 is an exemplary view showing a method of displaying a cosmetics list according to an embodiment of the present invention.

Referring to FIG. 9, the display unit 109 may display a cosmetics list 90. According to the embodiment, the display unit 109 may further display a view option setting item 80 together with the cosmetics list 90.

When the control unit 117 receives a command for selecting any one of the view option setting items 80, the control unit 117 may change and display a cosmetics list according to the selected view option setting item. The view option setting item may include a 'view after setting only possessed cosmetics' item, a 'view according to remaining usage period' item, and a 'view no-use/purchase suggestion item, but it is merely exemplary.

Figure 10:
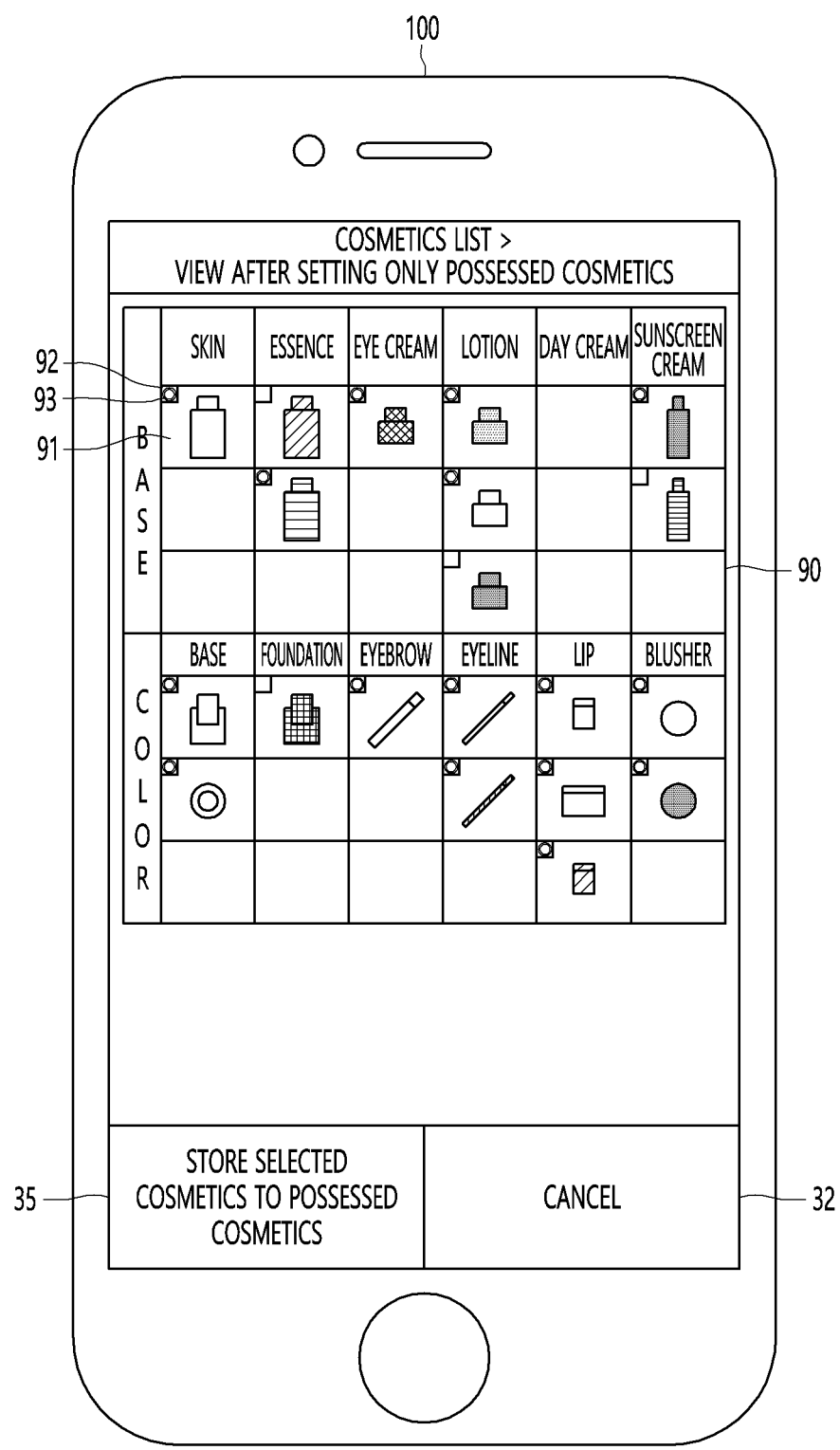
FIG. 10 is an exemplary view showing a method of manually setting only possessed cosmetics according to an embodiment of the present invention.
Figure 11:
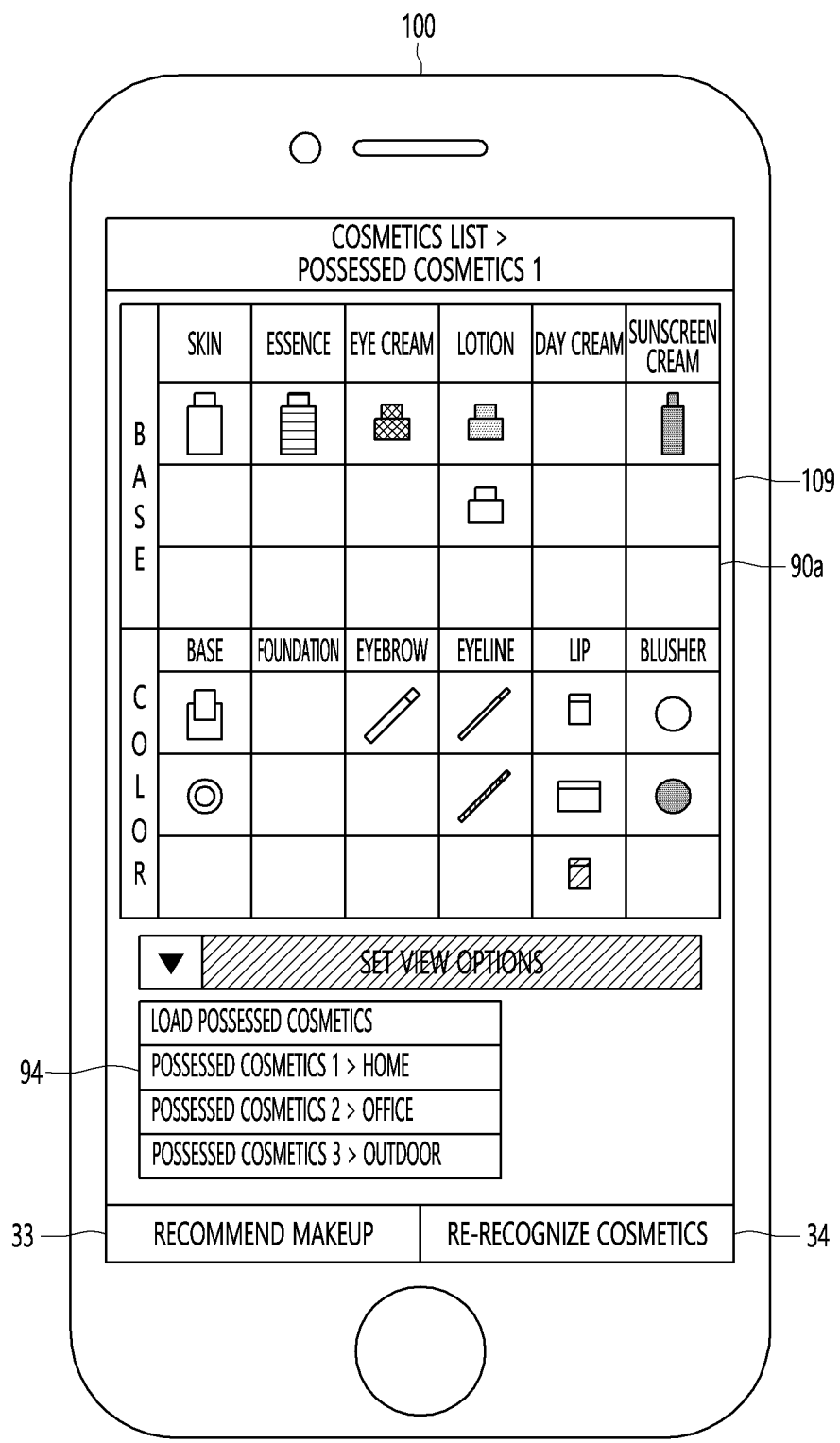
FIG. 11 is an exemplary view showing a method of displaying a cosmetics list showing possessed cosmetics according to a first embodiment of the present invention.
Figure 12:
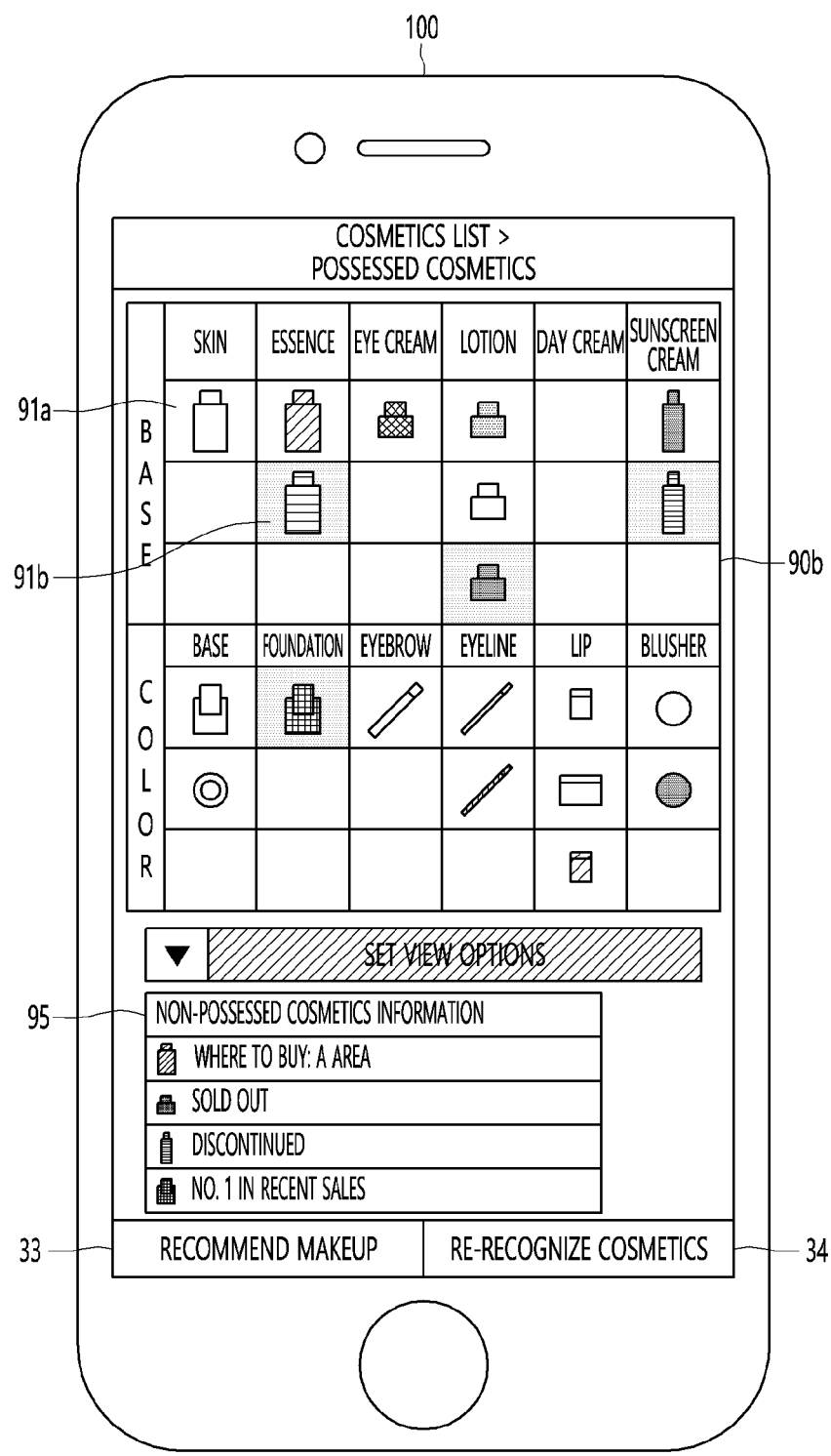
FIG. 12 is an exemplary view showing a method of displaying a cosmetics list showing possessed cosmetics according to a second embodiment of the present invention.

FIG. 10 is an exemplary view showing a method of manually setting only possessed cosmetics according to an embodiment of the present invention, FIG. 11 is an exemplary view showing a method of displaying a cosmetics list showing possessed cosmetics according to a first embodiment of the present invention, and FIG. 12 is an exemplary view showing a method of displaying a cosmetics list showing possessed cosmetics according to a second embodiment of the present invention.

As shown in FIG. 10, the control unit 117 may display a recognized cosmetic icon 91 indicating each of the cosmetics recognized in the cosmetics list 90, and may classify each of the recognized cosmetic icons 91 according to cosmetic categories. The user may select a recognized cosmetic icon 91 indicating the possessed cosmetics among the recognized cosmetic icons 91. The control unit 117 may further display a selection icon 93 on a status icon 92 for selected recognized cosmetic icons among the recognized cosmetic icons 91, and may not display the selection icon 93 on the status icon 92 for non-selected recognized cosmetic icons.

In this way, the user may manually select only the cosmetics that the user actually possesses among the recognized cosmetics.

When the control unit 117 receives a command for selecting a storage icon 35 after receiving a command for selecting at least one recognized cosmetic icon 91 in the cosmetics list 90, the control unit 117 may store the cosmetics list consisting of the selected recognized cosmetics.

Referring to FIG. 11, the control unit 117 may display a cosmetics list 90a consisting of only the selected cosmetics among the recognized cosmetics.

That is, the control unit 117 may change the cosmetics list 90 consisting of the recognized cosmetics to the cosmetics list 90a consisting of only the selected cosmetics that the user actually possesses to display on the display unit 109.

Meanwhile, as shown in FIG. 12, the control unit 117 may display a cosmetics list 90b configured by distinguishing between the selected cosmetics and the non-selected cosmetics among the recognized cosmetics.

That is, the control unit 117 may change the cosmetics list 90 consisting of the recognized cosmetics to the cosmetics list 90b configured so that the selected cosmetics that the user actually possesses and the non-selected cosmetics are displayed differently to display on the display unit 109.

The control unit 117 may further display a possessed cosmetics list 94. The possessed cosmetics list 94 may include a cosmetics list in which a specific cosmetic is selected and stored in the manner described with reference to FIG. 10.

Accordingly, the control unit 117 may generate a possessed cosmetics list only for a user existing in each place. For example, the control unit 117 may store a possessed cosmetics list indicating cosmetics existing at home, a possessed cosmetics list indicating cosmetics existing in an office, and a possessed cosmetics list indicating cosmetics used for going out.

The control unit 117 may display the cosmetics list 90b indicating the possessed cosmetics by a possession icon 91a indicating the cosmetics selected by the user and a non-possession icon 91b indicating the cosmetics not selected by the user. At this time, the control unit 117 may further display non-possessed cosmetic information 95. The non-possessed cosmetic information 95 may represent information of each cosmetic corresponding to the non-possession icon 91b of the cosmetics list 90b. In particular, the non-possessed cosmetic information 95 may include purchase information or sales information of each cosmetic corresponding to the non-possession icon 91b. For example, the non-possessed cosmetic information 95 may include a place in which cosmetics can be purchased, a sold out state, a discontinued state, a sales ranking state, and the like.

Figure 13:
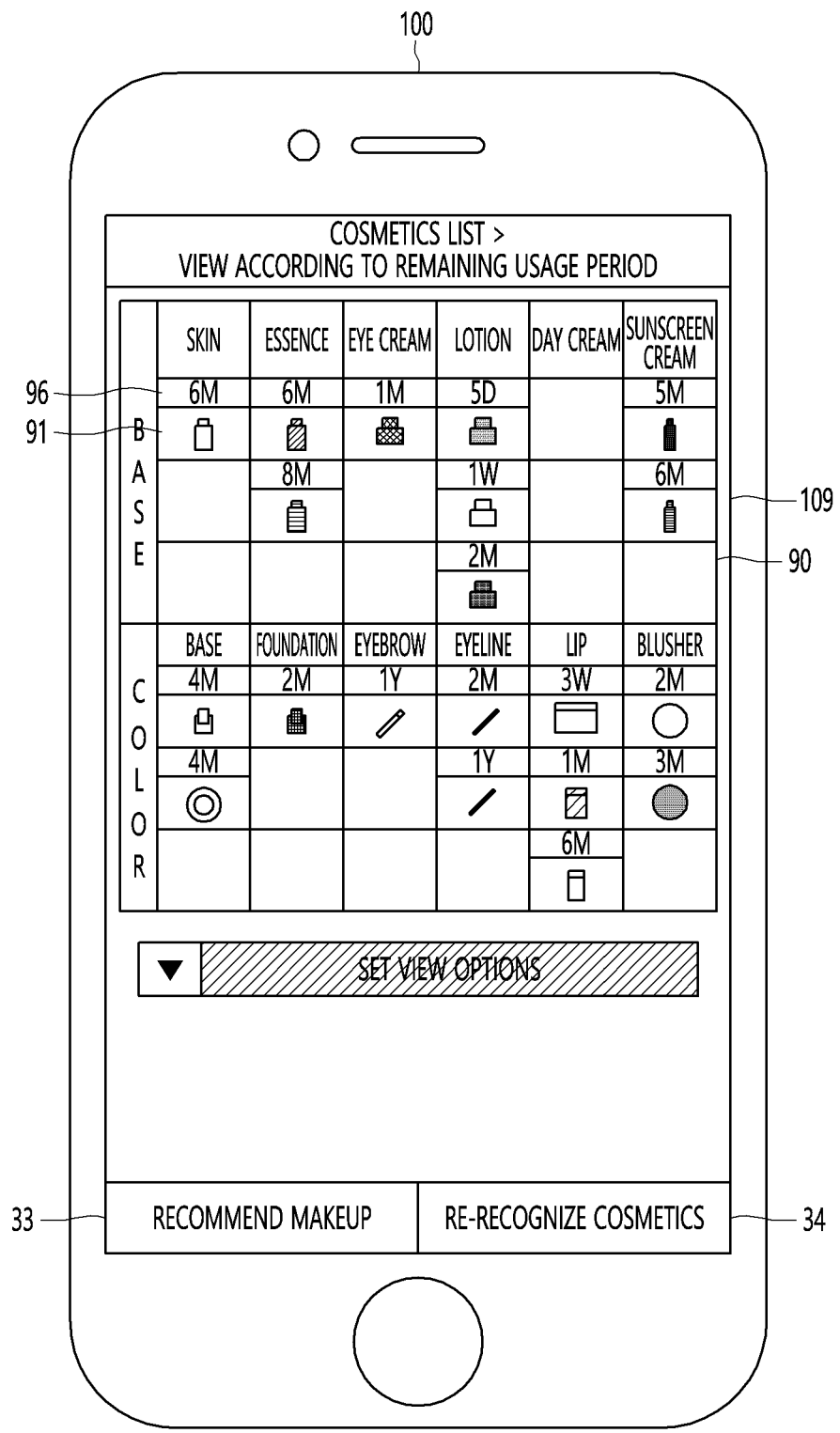
FIG. 13 is an exemplary view showing a method of displaying a cosmetics list according to a remaining usage period according to the first embodiment of the present invention.
Figure 14:
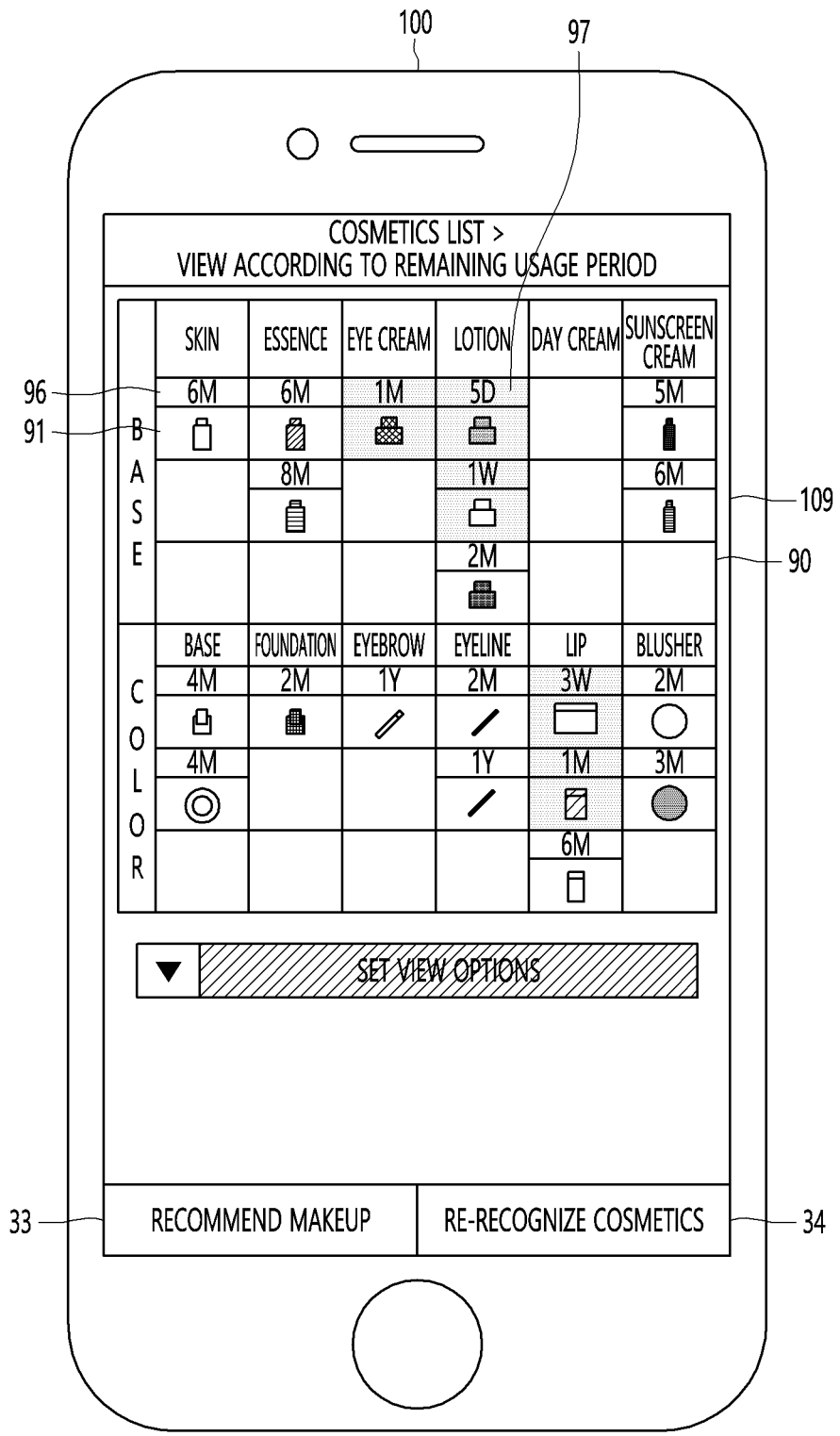
FIG. 14 is an exemplary view showing a method of displaying a cosmetics list according to a remaining usage period according to the second embodiment of the present invention.

Next, FIG. 13 is an exemplary view showing a method of displaying a cosmetics list according to a remaining usage period according to the first embodiment of the present invention, and FIG. 14 an exemplary view showing a method of displaying a cosmetics list according to a remaining usage period according to the second embodiment of the present invention.

When displaying the cosmetics list 90, the control unit 117 may display cosmetics in ascending order of remaining usage periods of the cosmetics.

In addition, as shown in FIG. 13, according to the first embodiment of the present invention, the control unit 117 may display the cosmetics list 90 including the recognized cosmetic icon 91 and a remaining period icon 96. The cosmetics list 90 may include at least one recognized cosmetic icon 91 indicating cosmetics recognized by the RFID reader unit 113 or the barcode reader unit 115, and each of the recognized cosmetic icons 91 may include the remaining period icon. 96.

The remaining period icon 96 may include a remaining usage period of cosmetics corresponding to the recognized cosmetic icon 91. The remaining usage period of the cosmetics may be calculated based on at least one of manufacture date information of the cosmetics included in the cosmetic information or recognition date information that the cosmetic is recognized. For example, the control unit 117 calculates an expiration date of the cosmetic by adding an average usable period of corresponding cosmetics to the manufacture date of the cosmetic included in the cosmetic information, and then may calculate a remaining period from the current date to the expiration date as the remaining usage period. Alternatively, when there is no manufacture date information of the cosmetics in the cosmetic information, an expiration date of cosmetics may be calculated by adding an average usable period of the corresponding cosmetics or a period obtained by subtracting a predetermined period from the average usage period of the cosmetics to the recognition date at which the cosmetics are recognized by the RFID reader unit 113 or the barcode reader unit 115, and the remaining period from the current date to the expiration date may be calculated as the remaining usage period. In some cases, the cosmetic information received from the RFID tag 11 may include valid period information of the cosmetics.

For example, the remaining period icon 96 may indicate the remaining usage period of the cosmetics such as '6M', '5D', '1W' or '1Y', and '6M' may indicate that the remaining usage period is 6 months, '5D' may indicate that the remaining usage period is 5 days, '1W' may indicate that the remaining usage period is 1 week, and '1Y' may indicate that the remaining usage period is 1 year. However, such a method is merely exemplary and need not be limited thereto.

As shown in FIG. 14, according to the second embodiment of the present invention, the control unit 117 may further display a period imminent icon 97 for cosmetics for which the remaining usage period of the cosmetics included in the cosmetics list 90 is less than a preset period. In detail, the control unit 117 may acquire the cosmetics for which the remaining usage period of the cosmetics included in the cosmetics list 90 is less than the preset period, and may display the period imminent icon 97 corresponding to the recognized cosmetic icon 91 of the acquired cosmetics.

Accordingly, there is an advantage that the user may quickly check cosmetics that should be used quickly or should be refrained from being used among the cosmetics possessed by the user.

Figure 15:
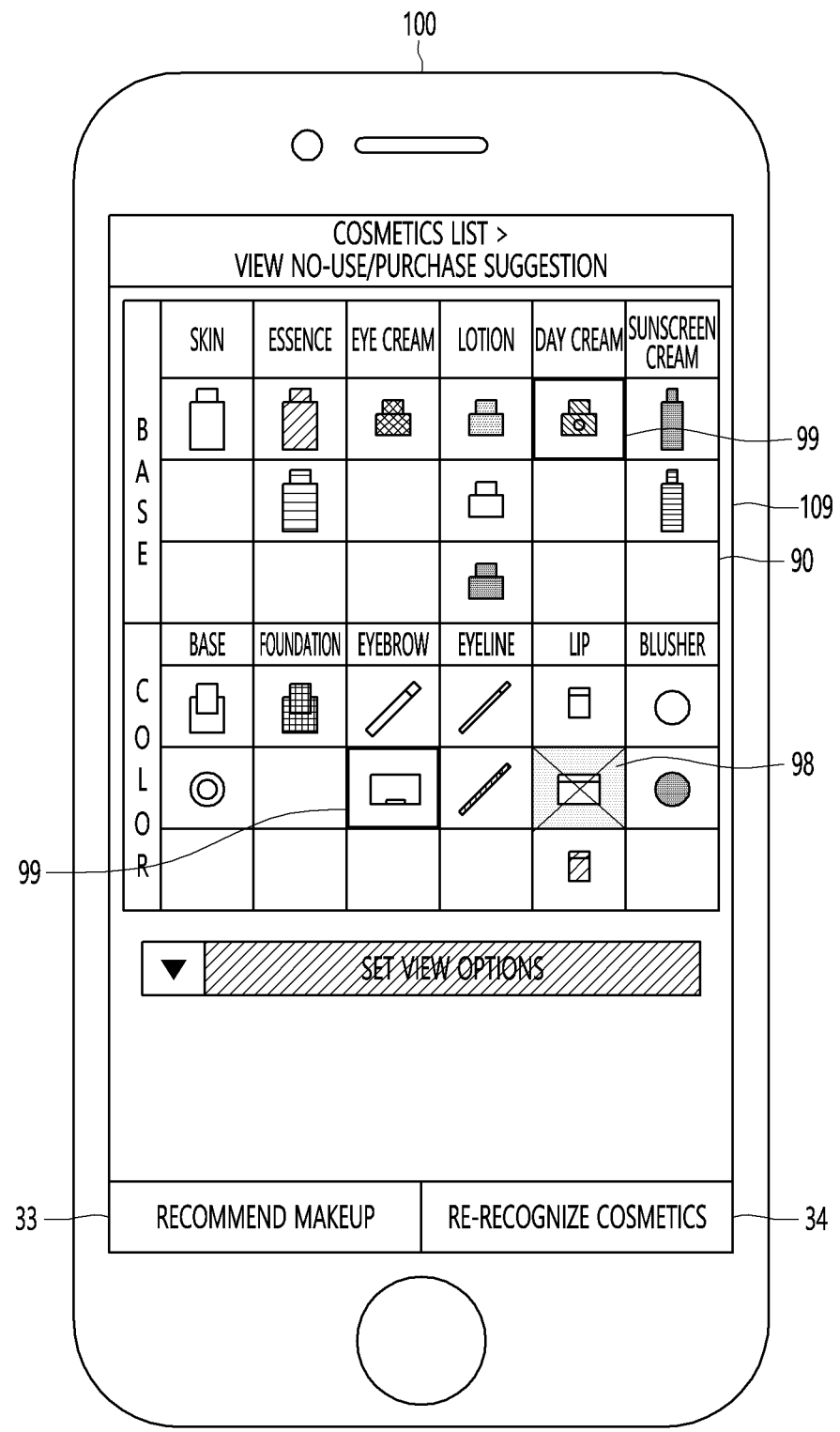
FIG. 15 is an exemplary view showing a method of displaying a cosmetics list according to a no-use/purchase suggestion according to an embodiment of the present invention.

Next, FIG. 15 is an exemplary view showing a method of displaying a cosmetics list according to a no-use/purchase suggestion according to an embodiment of the present invention.

The control unit 117 may further display a no-use suggestion icon 98 for restricting use of cosmetics in the cosmetics list 90 or a purchase suggestion icon 99 for suggesting purchase of cosmetics.

The no-use suggestion icon 98 may be displayed on the recognized cosmetic icon 91 of, among the recognized cosmetics, cosmetics for which the expiration date has passed (when the remaining usage period is negative), cosmetics in which harmful ingredients are present among cosmetics ingredients, cosmetics in which ingredients that do not match the user's skin are present among cosmetics ingredients and the like.

The purchase suggestion icon 99 may be an icon indicating cosmetics proposed to be purchased by the user, and may be an icon indicating cosmetics not recognized. When there is a cosmetic category without the recognized cosmetics, the control unit 117 may display the purchase suggestion icon 99 including at least one cosmetic corresponding to the corresponding cosmetic category. Alternatively, when re-recognizing the cosmetics at the same location, the control unit 117 may display a notification that, when re-recognizing, the previously recognized cosmetics are not recognized. That is, the control unit 117 may generate a first cosmetics list by recognizing the cosmetics at the first location, and may generate a second cosmetics list by recognizing the cosmetics at the second location. When re-recognizing the cosmetics at the first location, the control unit 117 may display a notification when a part of the cosmetics included in the first cosmetics list is not recognized or the cosmetics not included in the first cosmetics list are recognized, and when re-recognizing the cosmetics at the second location, the control unit 117 may display the notification when a part of the cosmetics included in the second cosmetics list is not recognized or the cosmetics not included in the second cosmetics list are recognized. Here, the notification may be a notification indicating an occurrence of a change such as disappearance of the corresponding cosmetics, or may be a notification displaying the purchase suggestion icon 99 that proposes purchasing of another similar cosmetic.

The view options of the cosmetics list described above are merely exemplary, and need not be limited thereto. That is, according to the embodiment of the present invention, the control unit 117 may display the cosmetics list indicating cosmetics recognized at a predetermined distance in various ways.

FIG. 3 will be described again.

The control unit 117 may determine whether a makeup recommendation command according to the cosmetics list has been received (S323), and when the makeup recommendation command is received, the control unit 117 may display a makeup method using at least one cosmetic included in the cosmetics list (S325).

The control unit 117 may further display a makeup recommendation icon 33 when displaying the cosmetics list 90. When the control unit 117 receives a command for selecting the makeup recommendation icon 33, the control unit 117 may determine that the makeup recommendation command according to the cosmetics list 90 has been received.

The control unit 117 may recommend and display the makeup method using cosmetics included in the cosmetics list 90 when receiving the makeup recommendation command.

Figure 16:
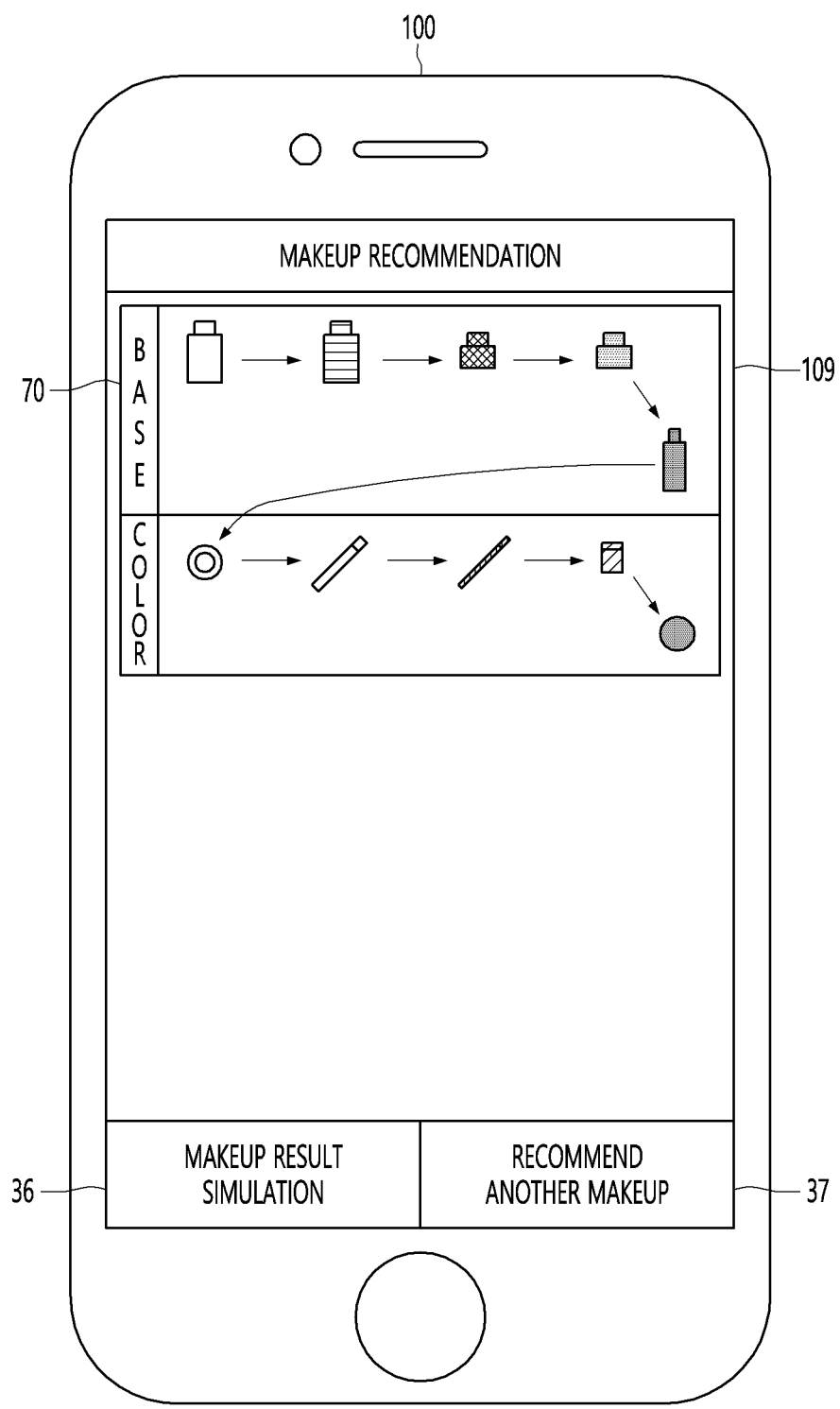
FIG. 16 is an exemplary view showing a method of recommending a makeup method according to an embodiment of the present invention.

FIG. 16 is an exemplary view showing a method of recommending a makeup method according to an embodiment of the present invention.

As shown in FIG. 16, the control unit 117 may display a makeup recommendation result 70. The makeup recommendation result 70 may include order information for using a plurality of cosmetics acquired from the cosmetics list 90.

According to the embodiment, the control unit 117 may acquire one cosmetic for each cosmetic category among the cosmetics included in the cosmetics list 90. Alternatively, the control unit 117 may preferentially acquire cosmetics having a short remaining usage period for each cosmetic category. Alternatively, the control unit 117 may acquire cosmetics based on the user information or the environment information received in steps S303 and S305.

The control unit 117 may further display detailed makeup method information (not shown) together with the makeup recommendation result 70, and the detailed makeup method information may include cosmetic usage method information for each cosmetic included in the makeup recommendation result 70.

The control unit 117 may further include a makeup result simulation icon 36 or another makeup recommendation icon 37 together with the makeup recommendation result 70.

The makeup result simulation icon 36 may be an icon indicating a case in which the user uses makeup according to the makeup recommendation result 70 as a simulation.

Another makeup recommendation icon 37 is an icon for displaying another makeup recommendation result other than the displayed makeup recommendation result 70. Likewise, another makeup recommendation result may also indicate a makeup order and method consisting the cosmetics included in the cosmetics list 90.

Figure 17:
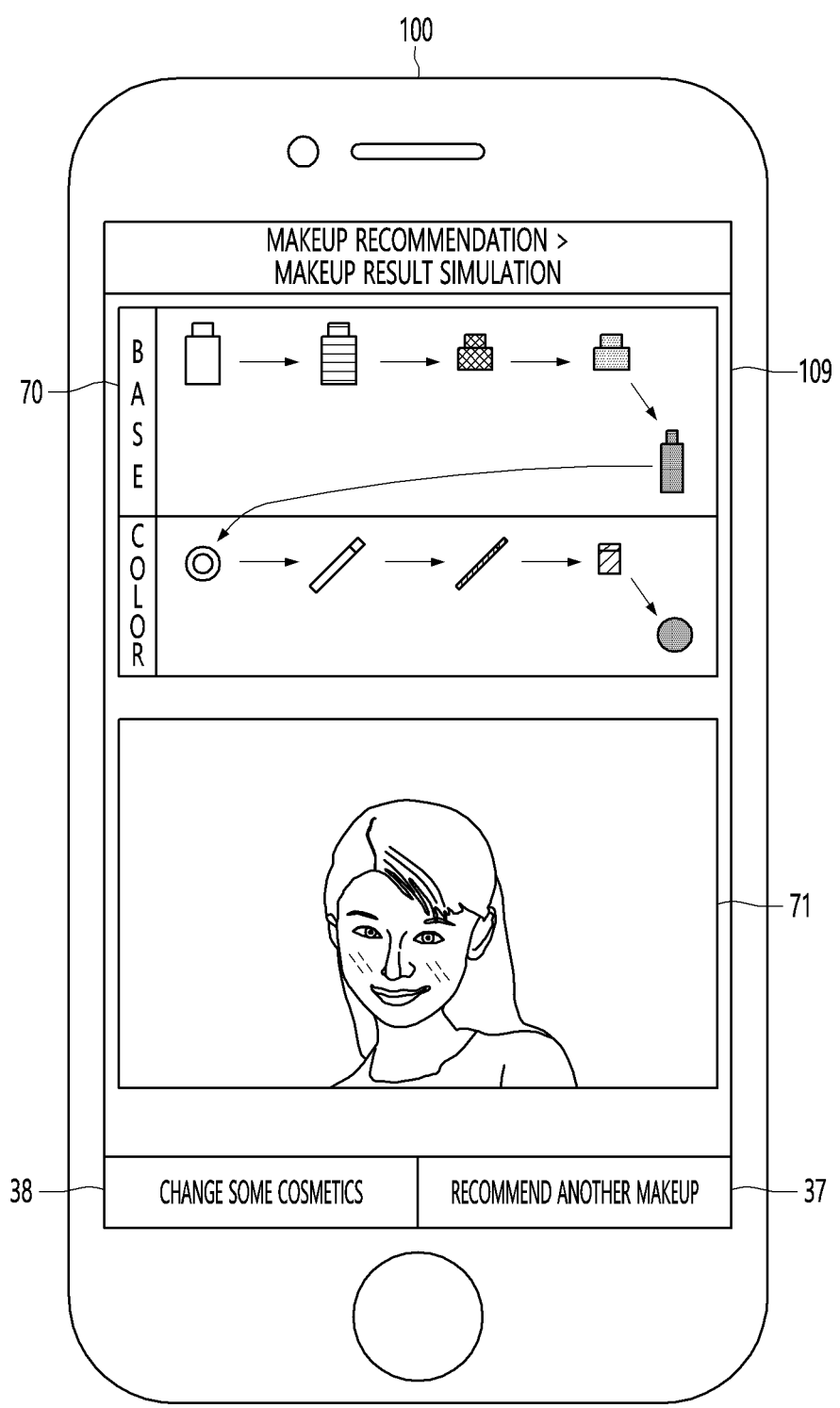
FIG. 17 is an exemplary view showing a simulation of makeup results according to the first embodiment of the present invention.

FIG. 17 is an exemplary view showing a simulation of makeup results according to the first embodiment of the present invention.

When the control unit 117 receives a command for selecting the makeup result simulation icon 36, the control unit 117 may display a makeup simulation image 71 as shown in FIG. 17.

The makeup simulation image 71 may be an image that virtually predicts a result of applying makeup according to the makeup recommendation result 70 to a face of the user photographed by the camera 105. That is, the makeup simulation image 71 may be an image indicating an appearance of the user when the makeup is completed in a makeup type and makeup order according to the makeup recommendation result 70.

Thus, there is an advantage that the user may check the makeup result before actually using the makeup according to the makeup recommendation result 70 to select a makeup method.

FIGS. 18 to 21 are exemplary views showing a simulation of makeup results according to the second embodiment of the present invention.

The control unit 117 may display a makeup simulation image 71a by reflecting at least one of user information or environment information in the makeup recommendation result 70.

In detail, the control unit 117 may combine a makeup facial image 71b that has completed makeup according to the makeup recommendation result 70 and a background image 71c based on at least one of the user information or the environment information to generate and display the makeup simulation image 71a.

Here, the makeup facial image 71b may be the same as the makeup simulation image 71 as described in FIG. 17.

The background image 71c may be an image that is combined as a background of the makeup facial image 71b, and may be varied according to the user information or the environment information.

Figure 18:
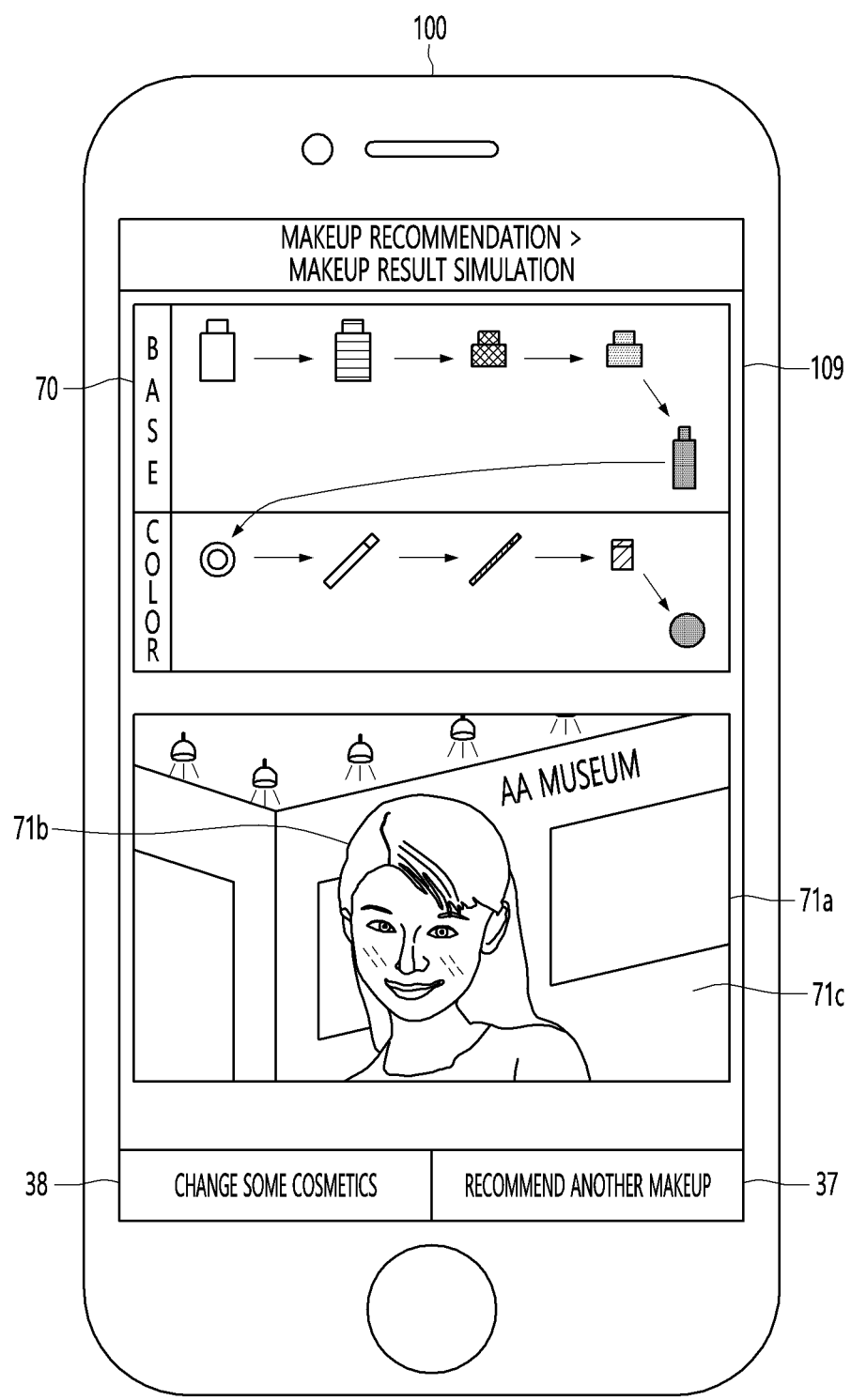
FIGS. 18 to 21 are exemplary views showing a simulation of makeup results according to the second embodiment of the present invention.

In detail, when a schedule at a specific place is registered as the user information, the control unit 117 may receive an image of the place in which the schedule is registered from the server 1 to combine as the background image 71c. For example, when a schedule in a museum is registered, as shown in FIG. 18, the control unit 117 may receive an image of the museum to acquire it as the background image 71c, and then may combine as the background of the makeup facial image 71b.

Figure 19:
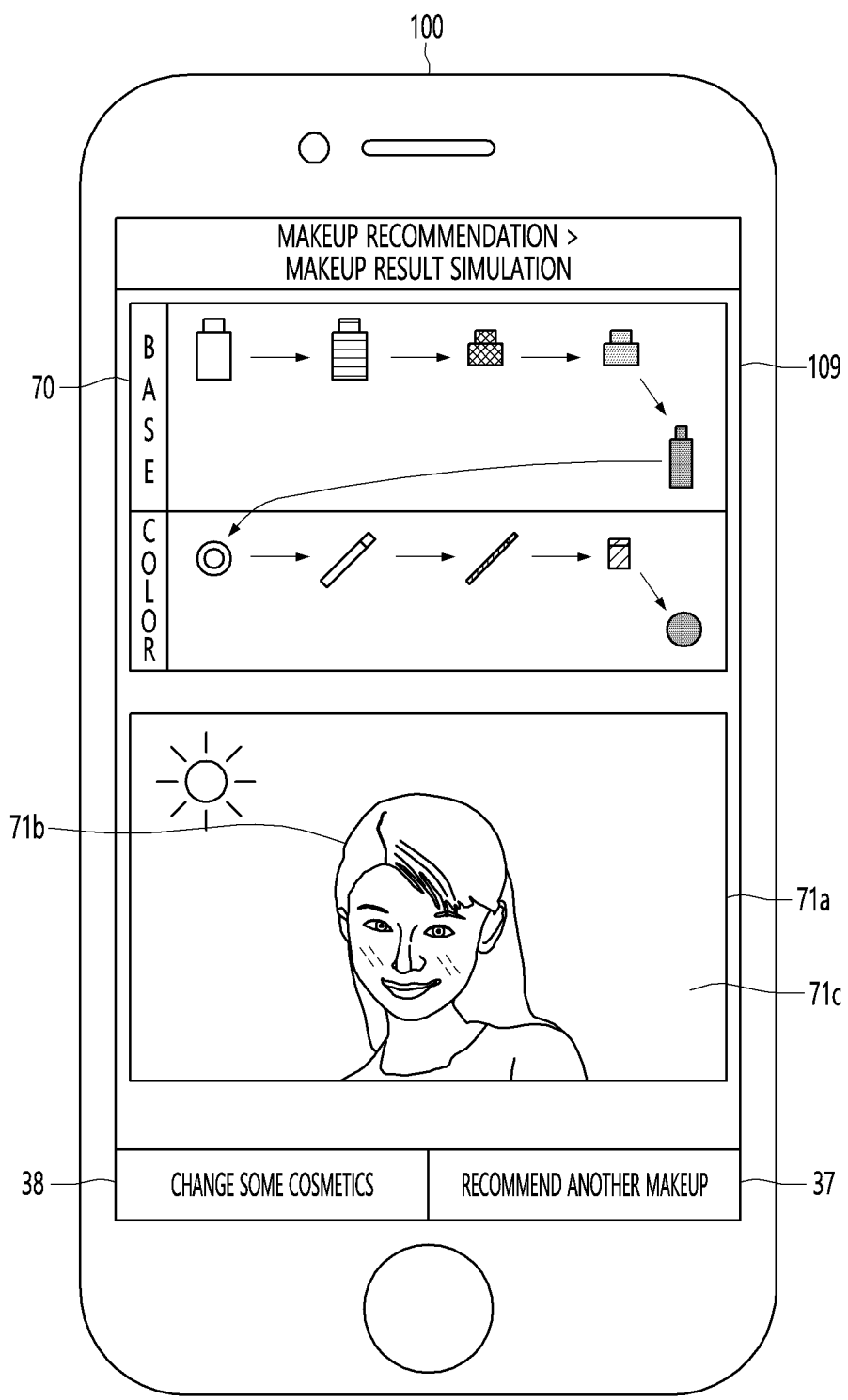
Figure 20:
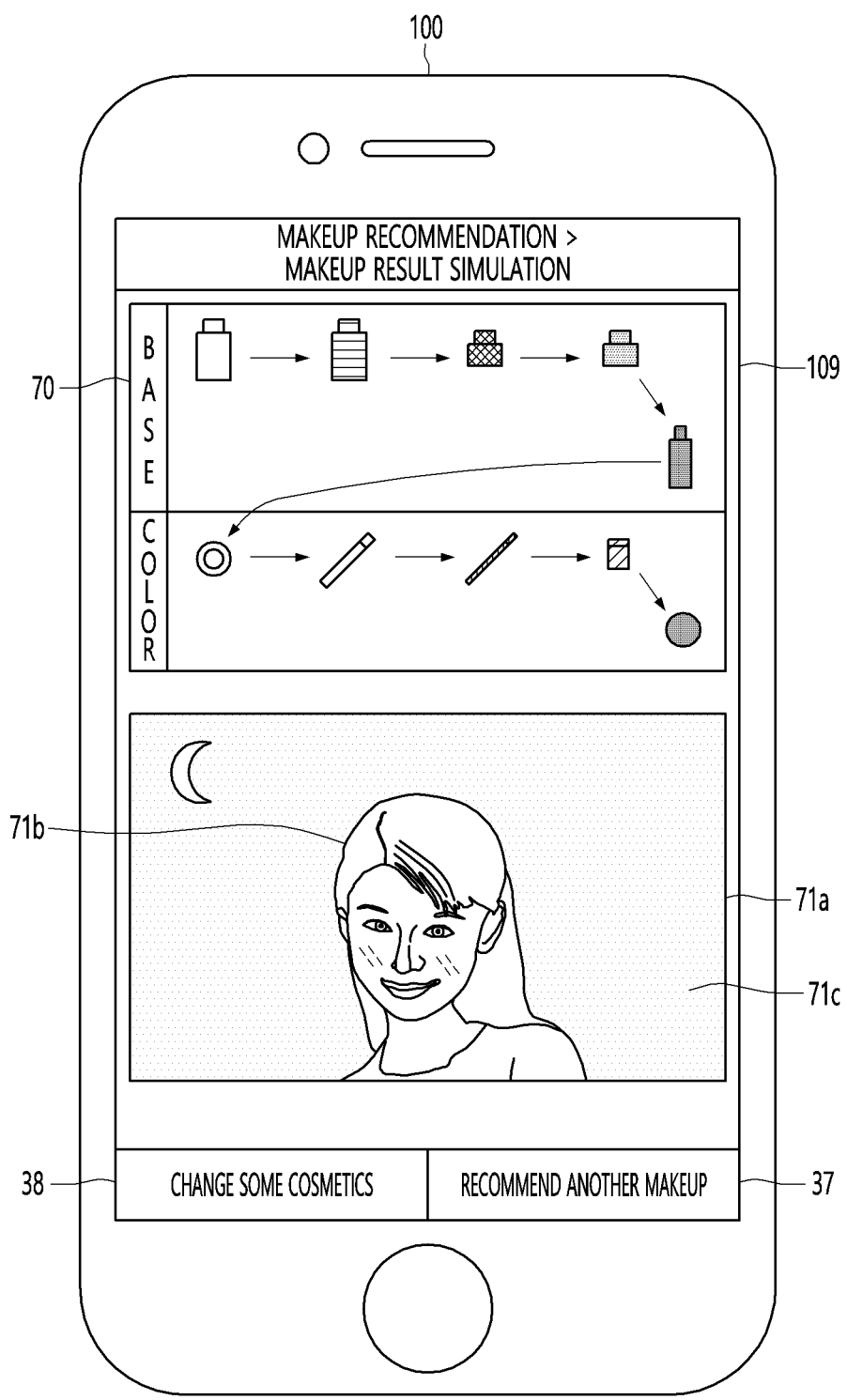
Figure 21:
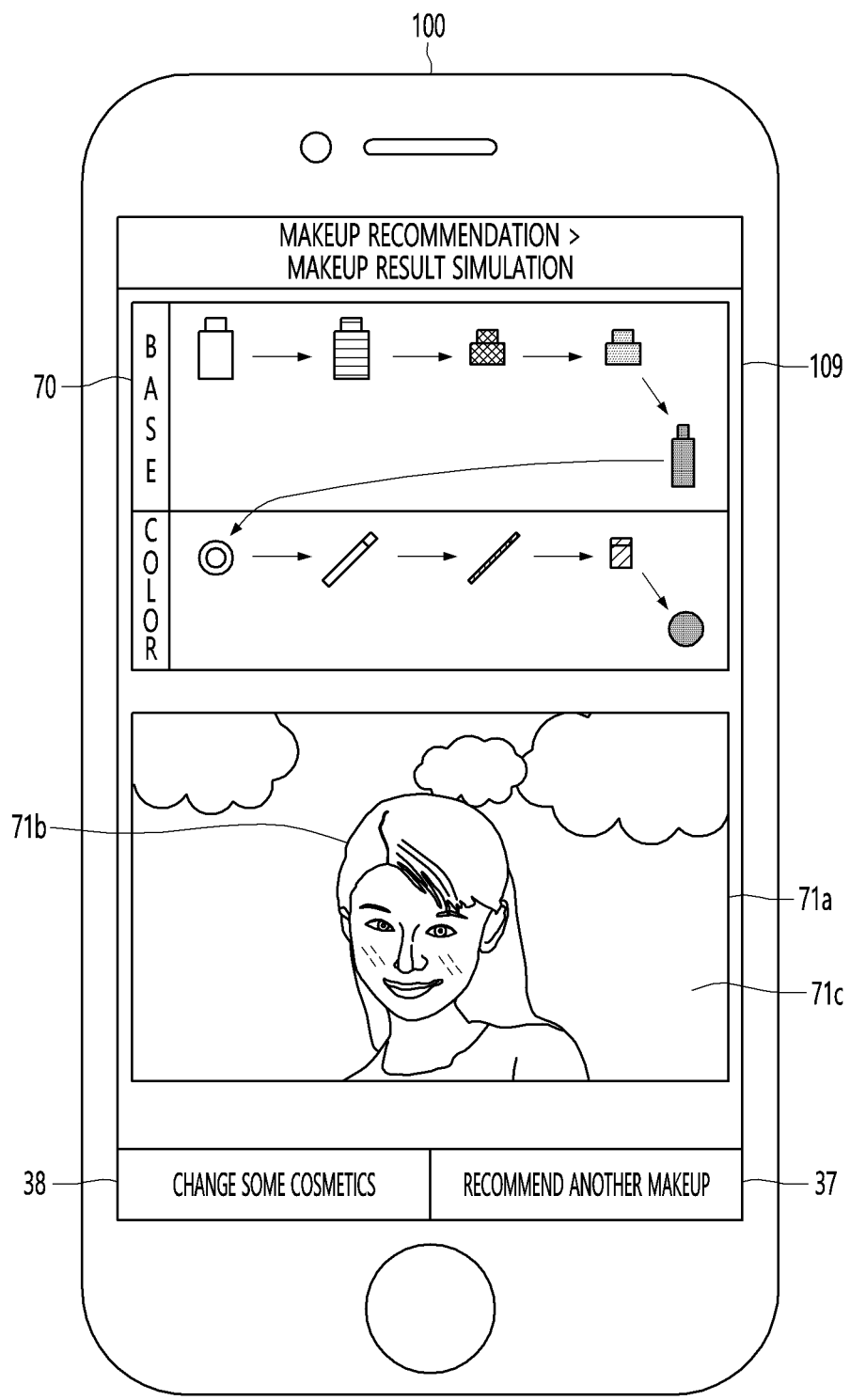

In addition, when a schedule for a specific time is registered as the user information, the control unit 117 may receive an image of the time at which the schedule is registered from the server 1 to combine as the background image 71c. For example, the control unit 117 may acquire an image having brightness of a time period in which the schedule is registered as the background image 71c, and then may combine as the background of the makeup facial image 71b. Accordingly, when a schedule for a day time period is registered, as shown in FIG. 19, the control unit 117 may combine a background image having a bright brightness as the background image 71c of the makeup facial image 71b. When a schedule for a night time period is registered, as shown in FIG. 20, the control unit 117 may combine a background image having a dark brightness as the background image 71c of the makeup facial image 71b. The control unit 117 may acquire a background image having a different brightness by acquiring brightness of a corresponding time period of a corresponding season even in the same day time period or the same night time period. Accordingly, there is an advantage that the user's makeup result may be displayed more delicately even in consideration of surroundings according to the schedule.

In addition, the control unit 117 may acquire a background image 71*c* reflecting a weather as the environment information to combine it to the makeup facial image 71*b*. For example, when the weather is cloudy, as shown in FIG. 19, the control unit 117 may receive the clouded background image 71*c* from the server 1 to combine as the background of the makeup facial image 71*b*.

As described above, according to the embodiment of the present invention, it is possible to display not only a facial image according to the user's makeup completion but also a background image considering brightness, a lighting color, etc. of the background image based on today's weather, a place in which the schedule is registered, and a time period in which the schedule is registered. Accordingly, there is an advantage that the user may check not only the facial image according to the makeup completion but also whether it is suitable for today's weather, today's place, etc.

When displaying the makeup simulation image 71, the control unit 117 may further display a cosmetic change icon 38 of some cosmetics.

The cosmetic change icon 38 of some cosmetics may be an icon for changing at least one cosmetic or makeup order displayed on the makeup recommendation result 70.

Figure 22:
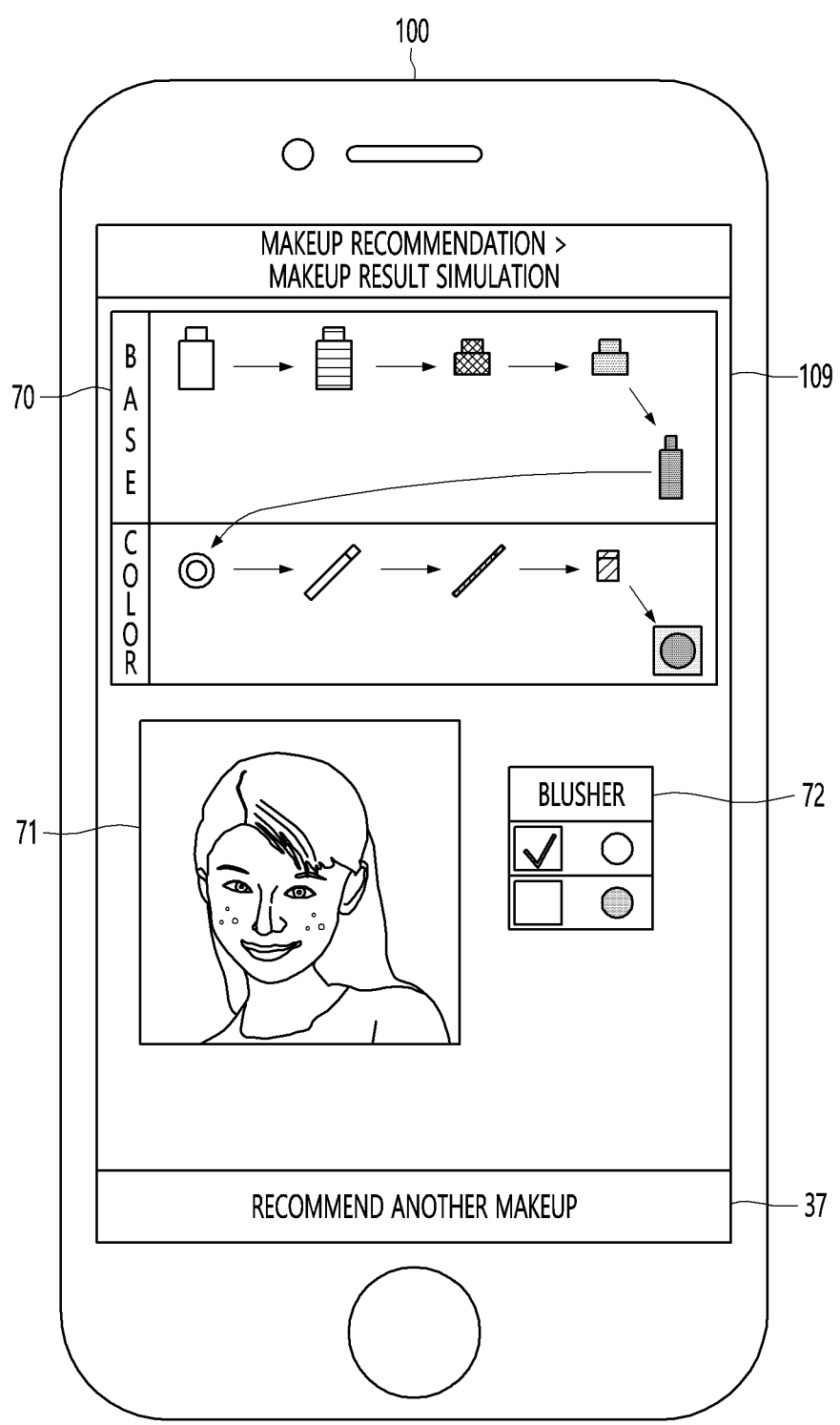
FIG. 22 is an exemplary view showing a method of changing some cosmetics in a makeup recommendation result according to an embodiment of the present invention.

FIG. 22 is an exemplary view showing a method of changing some cosmetics in a makeup recommendation result according to an embodiment of the present invention.

The control unit 117 may select the cosmetic change icon 38 of some cosmetics, and then may receive a command to select any one cosmetic from the makeup recommendation result 70. In this case, as shown in FIG. 22, the control unit 117 may further display a cosmetic change guide 72 corresponding to the selected cosmetic. The cosmetic change guide 72 may consist of only recognized cosmetics. Alternatively, the cosmetic change guide 72 may further include a purchase-proposed cosmetic together with the recognized cosmetics.

When the control unit 117 receives a command to select another cosmetic through the cosmetic change guide 72, the control unit 117 may apply the selected another cosmetic to change the makeup simulation image 71.

In addition, when the control unit 117 receives a makeup order change command of a selecting and dragging a cosmetic from the makeup recommendation result 70 and dropping it at a location of another cosmetic, the control unit 117 may change the makeup simulation image 71 accordingly to display it.

Thus, there is an advantage that the user may easily predict a makeup result.

Meanwhile, the control unit 117 may receive a command for selecting another makeup recommendation icon 37 on a screen on which the makeup recommendation result 70 is displayed.

Figure 23:
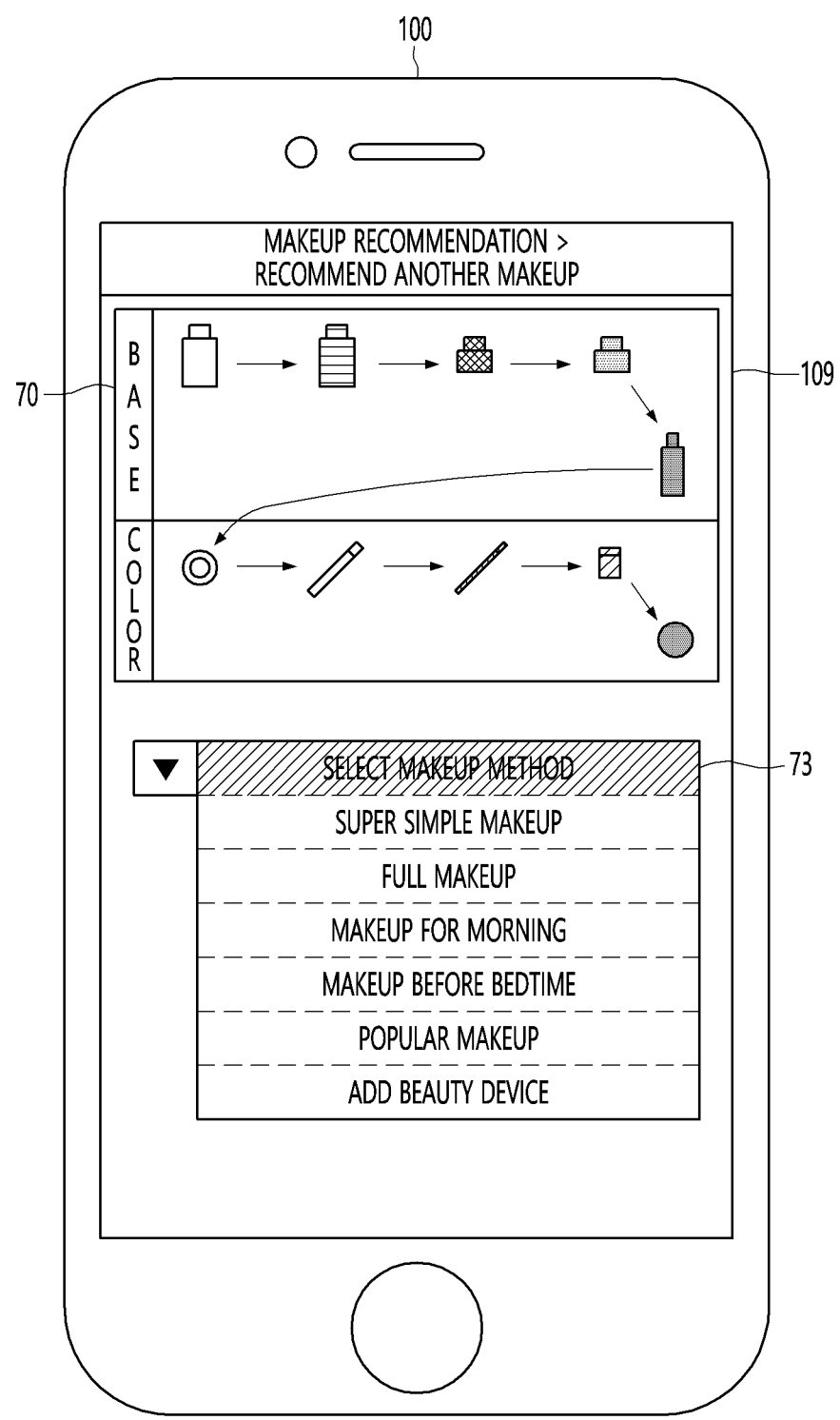
FIG. 23 is an exemplary view showing another makeup recommendation method according to an embodiment of the present invention.

FIG. 23 is an exemplary view showing another makeup recommendation method according to an embodiment of the present invention.

When the control unit 117 receives a command for selecting the another makeup recommendation icon 37, the control unit 117 may display a makeup method selection item 73.

The makeup method selection item 73 may indicate a makeup type. For example, the makeup method selection item 73 may include 'super simple makeup', 'full makeup', 'makeup for morning', 'makeup before bedtime', 'popular makeup' and 'add beauty device', etc., but it is merely exemplary and need not be limited thereto.

When the 'super simple makeup' is selected, the control unit 117 may change the makeup recommendation result 70 so as to indicate a makeup method in which a number of cosmetics is set to be less than a preset number, when the 'full makeup' is selected, the control unit 117 may change the makeup recommendation result 70 so as to indicate a makeup method in which a number of cosmetics corresponding to a color category included in the cosmetics list 90 is set to be the preset number or more, when the 'makeup for morning' is selected, the control unit 117 may change the makeup recommendation result 70 by selecting cosmetics in the cosmetics list 90 based on user information such as a schedule or environment information such as weather, when the 'makeup before bedtime' is selected, the control unit 117 may change the makeup recommendation result 70 by selecting cosmetics from the cosmetics list 90 as cosmetics with a lot of moisturizing ingredients, etc., when the 'popular makeup' is selected, the control unit 117 may change the makeup recommendation result 70 by receiving a popular makeup method from the server 1 and selecting cosmetics to be used therein, and when the 'add beauty device' is selected, the control unit 117 may change the makeup recommendation result 70 so as to recognize beauty devices registered already or beauty devices existing nearby to be added to the makeup method.

Figure 24:
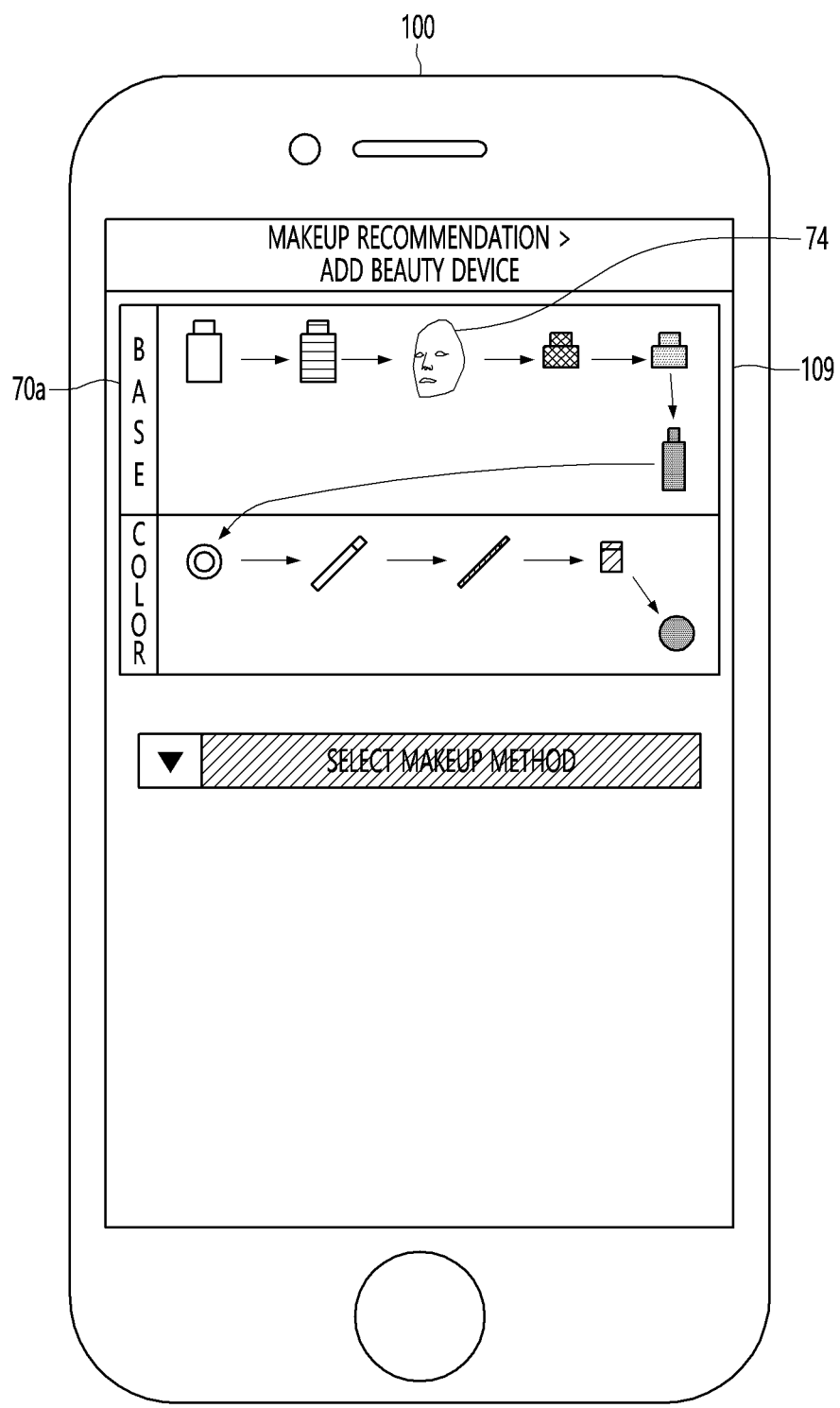
FIG. 24 is an exemplary view showing a method of changing a makeup method according to an embodiment of the present invention.

FIG. 24 is an exemplary view showing a method of indicating a makeup method change result according to an embodiment of the present invention.

In particular, FIG. 24 is an exemplary view showing a case in which 'add beauty device' is selected in the makeup method selection item 73.

When the 'add beauty device' is selected in the makeup method selection item 73, the control unit 117 may check a beauty device set already in the mobile terminal 100, or may check a beauty device existing within a predetermined distance. According to one embodiment, a beauty device, like cosmetics, may be attached with an RFID tag (not shown), and the control unit 117 may recognize the beauty device by the RFID reader unit 113 to check the presence of the beauty device.

When at least one beauty device is checked, the control unit 117 may display a changed makeup recommendation result 70*a* such that a beauty device icon 74 is added between cosmetics displayed in the makeup method.

However, the makeup type and the makeup change method described in FIGS. 23 and 24 are merely exemplary and need not be limited thereto.

The present invention described above may be implemented as computer-readable codes in a medium on which a program is recorded. The computer-readable medium includes all types of recording devices in which computer-readable data is stored. Examples of the computer-readable medium include a hard disk drive (HDD), a solid state disk (SSD), a silicon disk drive (SDD), a ROM, a RAM, a CD-ROM, a magnetic tape, a floppy disk, and an optical data storage, etc. In addition, the computer may include a control unit of a diagnosis device, a control unit of a skin management server, or a control unit of a manufacturing apparatus. Accordingly, the above detailed description should not be construed in a limiting sense in all respects, and should be considered as examples.

The scope of the present invention should be determined by rational interpretation of the appended claims, and encompasses all alterations falling within the equivalent scope of the appended claims.

The invention claimed is:

1. A mobile terminal comprising:
   an input unit configured to receive a makeup recommendation command;
   a display unit configured to display a makeup recommendation result according to the makeup recommendation command, and a makeup simulation image according to the makeup recommendation result; and
   a control unit configured to:
   display a cosmetic change guide to change at least one of cosmetics included in the makeup recommendation result to a cosmetic recognized by receiving cosmetic information from a radio-frequency identification (RFID) tag of the cosmetic as existing within a set recognition range,
   receive a cosmetic change command for the makeup recommendation result, and
   change the makeup simulation image based on a change of the makeup recommendation result,
   wherein the cosmetic information received from the RFID tag includes a recognition date at which the cosmetic is recognized and at least two of a name, an image, a category, a manufacturer, one or more properties, a manufacture date or an expiration date of the cosmetic calculated based on the recognition date of the cosmetic,
   wherein the control unit is further configured to:
   display the makeup recommendation result and the makeup simulation image using the received cosmetic information, which includes possessed cosmetic information and non-possessed cosmetic information, and
   wherein the non-possessed cosmetic information includes purchase information or sales information of each cosmetic.

2. The mobile terminal of claim 1, wherein the control unit is further configured to:
   display the makeup simulation image by combining a facial image and a background image, and
   acquire differently the background image according to user information or environment information.

3. The mobile terminal of claim 2, wherein the control unit is further configured to acquire the background image considering at least one or more of a place, brightness, or an illumination color based on at least one or more of a place of a schedule included in the user information, a time period of the schedule included in the user information, or weather information included in the environment information.

4. The mobile terminal of claim 2, wherein, when a schedule at a first place is registered in the user information, the control unit is further configured to acquire an image of the first place as the background image.

5. The mobile terminal of claim 2, wherein, when a schedule in a first time period is registered in the user information, the control unit is further configured to acquire an image having brightness corresponding to the first time period as the background image.

6. The mobile terminal of claim 2, wherein, when weather information is received as part of the environment information, the control unit is further configured to acquire an image according to the weather information as the background image.

7. The mobile terminal of claim 1, further comprising:
   a camera configured to photograph a face of a user,
   wherein the control unit is further configured to acquire a facial image by applying makeup according to the makeup recommendation result to the face photographed by the camera.

8. The mobile terminal of claim 1, wherein the control unit controls the display unit to display an icon to change a type of makeup in a state that the makeup simulation image is displayed.

9. The mobile terminal of claim 8, further comprising:
   a short-distance communication module configured to recognize the cosmetic through short-distance communication, and receive the cosmetic information of the recognized cosmetic,
   wherein the control unit is further configured to control the display unit to display the makeup recommendation result based on the recognized cosmetic recognized via the short-distance communication module.

10. The mobile terminal of claim 8, wherein the control unit is further configured to receive a cosmetic change command to change a type of the at least one cosmetics or the makeup order included in the makeup recommendation result.

11. The mobile terminal of claim 1, wherein, when displaying the cosmetic change guide, the control unit is further configured to suggest purchase of new cosmetics.

12. The mobile terminal of claim 1, wherein, when a selected makeup type is super simple makeup, the control unit is further configured to display a makeup method that uses less than a preset number of the at least one cosmetics as the makeup recommendation result.

13. The mobile terminal of claim 1, wherein, when a selected makeup type is makeup that specifies a time period, the control unit is further configured to display a makeup method in consideration of the specified time period as the makeup recommendation result.

14. The mobile terminal of claim 13, wherein the control unit is further configured to display a makeup method in consideration of user information or environment information related to the specified time period as the makeup recommendation result.

15. The mobile terminal of claim 1, wherein the cosmetic is recognized as existing by an identification tag attached to the cosmetic.

16. The mobile terminal of claim 1, wherein the control unit is further configured to display a period imminent icon for the cosmetic for which a remaining usage period of the cosmetic is less than a preset period based on the manufacture date.

17. The mobile terminal of claim 1, wherein the control unit is further configured to display a no-use suggestion icon for restricting use of the cosmetic based on the expiration date of the cosmetic.

18. A cosmetics automatic recognition system comprising:
   a server;
   a radio-frequency identification (RFID) reader unit configured to recognize a cosmetic by receiving cosmetic information from the RFID tags of the cosmetic; and
   a mobile terminal configured to receive information from the server,
   wherein the mobile terminal comprises:
   an input unit configured to receive a makeup recommendation command;
   a display unit configured to display a makeup recommendation result according to the makeup recommendation command, and a makeup simulation image according to the makeup recommendation result; and a control unit configured to:
display a cosmetic change guide to change at least one of cosmetics included in the makeup recommendation result to the cosmetic recognized by receiving the cosmetic information from the RFID tag of the cosmetic as existing within a set recognition range,
receive a cosmetic change command for the makeup recommendation result, and
change the makeup simulation image based on a change of the makeup recommendation result,
wherein the cosmetic information received from the RFID tag includes a recognition date at which the cosmetic is recognized and at least two of a name, an image, a category, a manufacturer, one or more properties, a manufacture date or an expiration date of the cosmetic calculated based on the recognition date of the cosmetic,
wherein the control unit is further configured to:
display the makeup recommendation result and the makeup simulation image using the received cosmetic information, which includes possessed cosmetic information and non-possessed cosmetic information, and
wherein the non-possessed cosmetic information includes purchase information or sales information of each cosmetic.

19. The cosmetics automatic recognition system of claim 18,
wherein the mobile terminal further comprises a short-distance communication module, and
wherein the display unit is further configured to:
display the makeup recommendation result based on at least one cosmetic recognized via the short-distance communication module, and
display the makeup simulation image by calculating a makeup application result according to the makeup recommendation result.

20. The cosmetics automatic recognition system of claim 18, wherein the cosmetic is recognized as existing by an identification tag attached to the cosmetic.

21. A non-transitory computer readable recording medium having stored thereon computer readable instructions, which when executed, cause at least one processor to execute, a makeup recommending method comprising:
receiving a makeup recommendation command;
displaying a makeup recommendation result according to the makeup recommendation command; and
displaying a makeup simulation image according to the makeup recommendation result,
wherein the makeup recommending method further comprises:
displaying a cosmetic change guide to change at least one of cosmetics included in the makeup recommendation result to a cosmetic recognized by receiving cosmetic information from a radio-frequency identification (RFID) tag of the cosmetic as existing within a set recognition range,
receiving a cosmetic change command for the makeup recommendation result, and
changing the makeup simulation image based on a change of the makeup recommendation result,
wherein the cosmetic information received from the RFID tag includes a recognition date at which the cosmetic is recognized and at least two of a name, an image, a category, a manufacturer, one or more properties, a manufacture date or an expiration date of the cosmetic calculated based on the recognition date of the cosmetic,
wherein the makeup recommendation result and the makeup simulation image are displayed using the received cosmetic information, the received cosmetic information including possessed cosmetic information and non-possessed cosmetic information, and
wherein the non-possessed cosmetic information includes purchase information or sales information of each cosmetic.

22. The non-transitory computer readable recording medium of claim 21, wherein the cosmetic is recognized as existing by an identification tag attached to the cosmetic.

* * * * *